United States Patent
Lee et al.

(10) Patent No.: US 8,904,060 B2
(45) Date of Patent: Dec. 2, 2014

(54) FIRST-IN FIRST-OUT MEMORY DEVICE AND ELECTRONIC APPARATUS HAVING THE SAME

(71) Applicant: Samsung Electronics Co., Ltd., Suwon-si, Gyeonggi-do (KR)

(72) Inventors: Dong-Han Lee, Seongnam-si (KR); Jae-Sop Kong, Gwacheon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 13/771,295

(22) Filed: Feb. 20, 2013

(65) Prior Publication Data

US 2013/0238822 A1 Sep. 12, 2013

(30) Foreign Application Priority Data

Mar. 7, 2012 (KR) ........................ 10-2012-0023593

(51) Int. Cl.
*G06F 3/00* (2006.01)
*G06F 5/06* (2006.01)
*G06F 5/14* (2006.01)

(52) U.S. Cl.
CPC *G06F 5/14* (2013.01); *G06F 5/065* (2013.01); *Y02B 60/1228* (2013.01); *Y02B 60/1235* (2013.01)
USPC ............................................... 710/33; 710/52

(58) Field of Classification Search
None
See application file for complete search history.

(56) References Cited

U.S. PATENT DOCUMENTS

| | | | |
|---|---|---|---|
| 6,044,419 A * | 3/2000 | Hayek et al. | 710/57 |
| 6,144,604 A | 11/2000 | Haller et al. | |
| 7,685,457 B2 * | 3/2010 | Jacobson et al. | 713/500 |
| 2002/0199042 A1 | 12/2002 | Kim et al. | |
| 2004/0257856 A1 | 12/2004 | Liu | |
| 2007/0076503 A1 | 4/2007 | Rosen | |
| 2007/0183241 A1 | 8/2007 | Batra | |
| 2009/0285045 A1 | 11/2009 | Vogel et al. | |
| 2013/0185491 A1* | 7/2013 | Lin et al. | 711/104 |

FOREIGN PATENT DOCUMENTS

| | | |
|---|---|---|
| JP | 11-149365 | 6/1999 |
| JP | 2000-011635 | 1/2000 |
| JP | 2003-196154 | 7/2003 |
| JP | 2005-346637 | 12/2005 |
| JP | 2006-113870 | 4/2006 |

OTHER PUBLICATIONS

Weiss, Data Structures and Problem Solving using C++, Addison Wesley Longman, 2nd, pp. 541-547.*

* cited by examiner

*Primary Examiner* — Cheng-Yuan Tseng
(74) *Attorney, Agent, or Firm* — F. Chau & Associates, LLC

(57) ABSTRACT

A first-in first-out (FIFO) memory device includes a main FIFO unit, an auxiliary FIFO unit and a control unit. The main FIFO unit includes first through N-th one-port memories, each of which including M entries, where N and M are integers greater than or equal to two. The auxiliary FIFO unit includes one dual-port memory having M entries. The control unit performs a write operation by receiving a write command and data and storing the data in one of the main FIFO unit and the auxiliary FIFO unit based on an operating mode, and performs a read operation by receiving a read command and reading the data from one of the main FIFO unit and the auxiliary FIFO unit based on the operating mode.

17 Claims, 19 Drawing Sheets

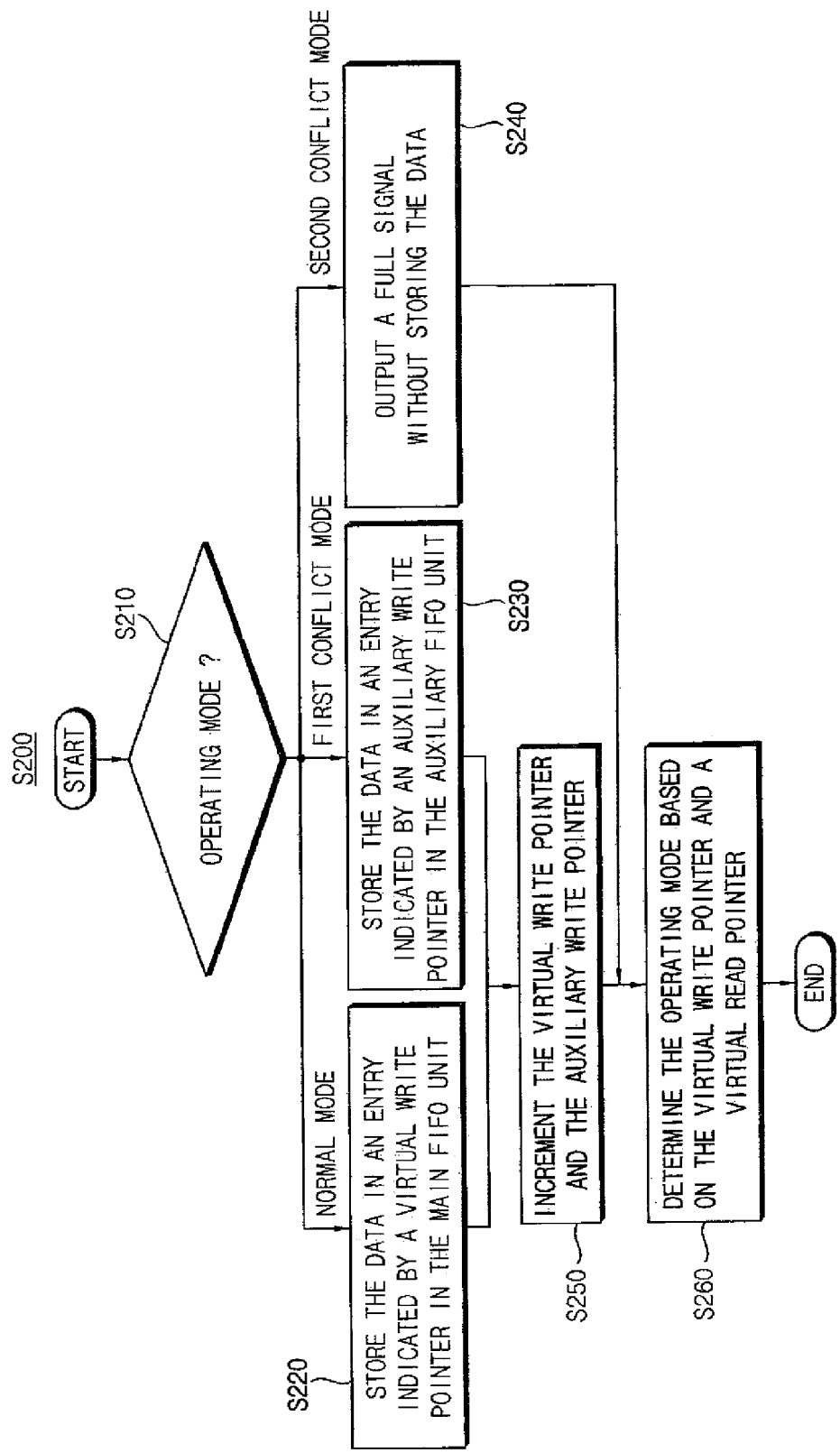

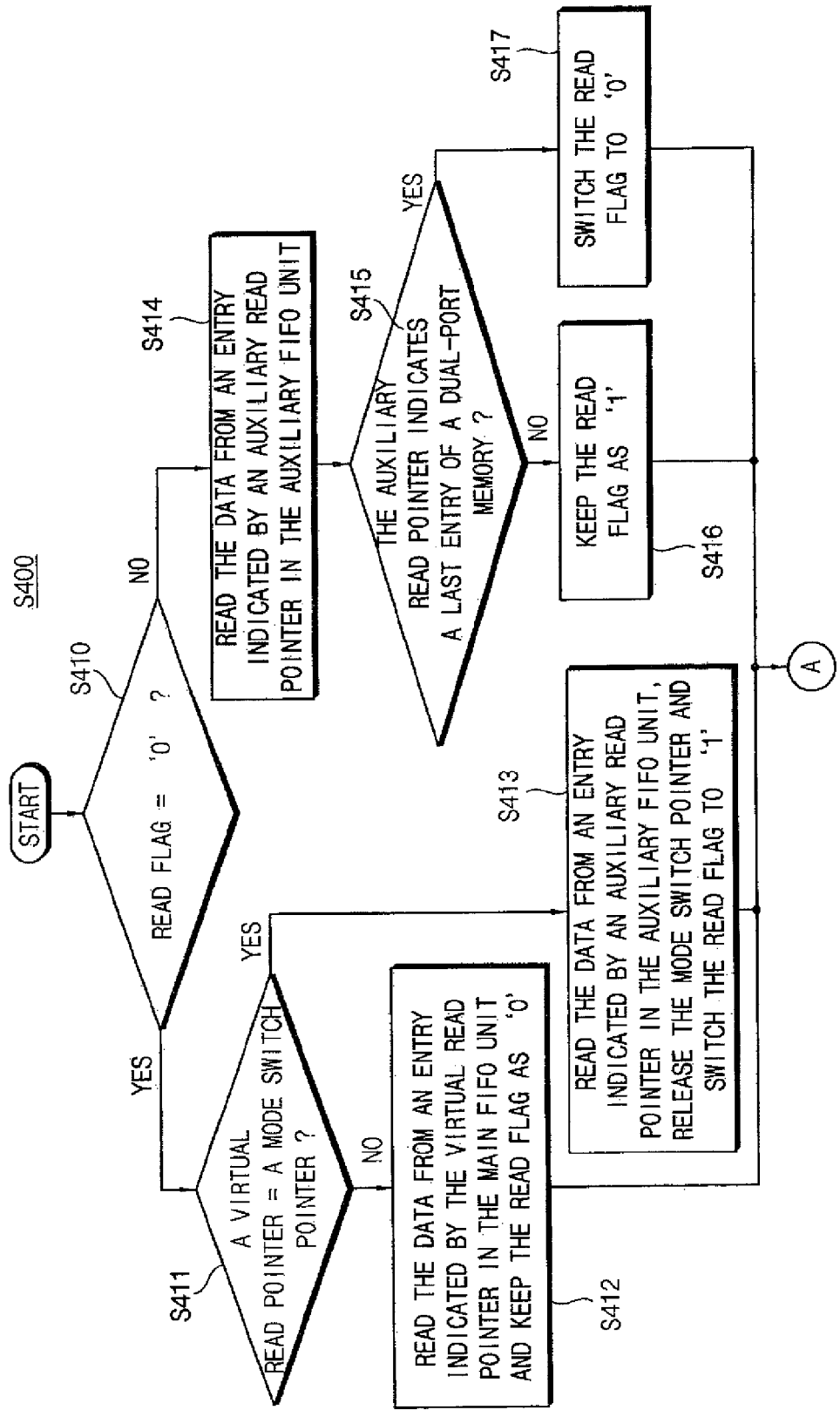

START

S510: AN ENTRY INDICATED BY THE VIRTUAL WRITE POINTER AND AN ENTRY INDICATED BY THE VIRTUAL READ POINTER ARE INCLUDED IN A SAME ONE-PORT MEMORY ?

NO → S520: DETERMINE THE OPERATING MODE AS THE NORMAL MODE

YES → S530: DETERMINE THE OPERATING MODE AS THE FIRST CONFLICT MODE IF THE VIRTUAL READ POINTER PRECEDES THE VIRTUAL WRITE POINTER OR THE VIRTUAL READ POINTER CATCHES UP TO THE VIRTUAL WRITE POINTER SUCH THAT THE VIRTUAL WRITE POINTER AND THE VIRTUAL READ POINTER INDICATE A SAME ENTRY

S540: DETERMINE THE OPERATING MODE AS THE SECOND CONFLICT MODE IF THE VIRTUAL WRITE POINTER PRECEDES THE VIRTUAL READ POINTER OR THE VIRTUAL WRITE POINTER CATCHES UP TO THE VIRTUAL READ POINTER SUCH THAT THE VIRTUAL WRITE POINTER AND THE VIRTUAL READ POINTER INDICATE A SAME ENTRY

END

FIRST-IN FIRST-OUT MEMORY DEVICE AND ELECTRONIC APPARATUS HAVING THE SAME

CROSS-REFERENCE TO RELATED APPLICATION(S)

This application claims priority under 35 USC §119 to Korean Patent Application No. 10-2012-0023593, filed on Mar. 7, 2012 in the Korean Intellectual Property Office (KIPO), the disclosure of which is incorporated by reference in its entirety herein.

BACKGROUND

1. Technical Field

Exemplary embodiments of the inventive concept relate to a first-in first-out (FIFO) memory device, and an electronic apparatus including the FIFO memory device.

2. Description of Related Art

The size of data (e.g., multimedia data) processed by an electronic apparatus has increased considerably. The electronic apparatus may include a first-in first-out (FIFO) memory device with a large capacity to handle the data. However, as the capacity of the FIFO memory device increases, power consumption of the FIFO memory device also increases.

Accordingly, there is a need for a FIFO memory device that consumes less power.

SUMMARY

At least one exemplary embodiment of the invention is directed to a first-in first-out (FIFO) memory device that uses less power.

At least one exemplary embodiment of the invention is directed to an electronic apparatus that includes the FIFO memory device.

According to an exemplary embodiment of the inventive concept, a first-in first-out (FIFO) memory device includes a main FIFO unit, an auxiliary FIFO unit and a control unit. The main FIFO unit includes first through N-th one-port memories, each of which including M entries, where N and M are integers greater than or equal to two. The auxiliary FIFO unit includes one dual-port memory having M entries. The control unit performs a write operation by receiving a write command and data and storing the data in one of the main FIFO unit and the auxiliary FIFO unit based on an operating mode, and performs a read operation by receiving a read command and reading the data from one of the main FIFO unit and the auxiliary FIFO unit based on the operating mode. The control unit may receive the write command and the data through a write channel After the data is read, the control unit may output the data through a read channel.

In an exemplary embodiment, the control unit determines the operating mode based on a number of the write operations that the control unit performed and a number of the read operations that the control unit performed.

In an exemplary embodiment, the control unit includes a virtual write pointer and a virtual read pointer, which circularly indicate entries of the first through the N-th one-port memories from a first entry of the first one-port memory to a last entry of the N-th one-port memory, and an auxiliary write pointer and an auxiliary read pointer, which circularly indicate entries of the dual-port memory from a first entry of the dual-port memory to a last entry of the dual-port memory, increment both the virtual write pointer and the auxiliary write pointer after performing the write operation and increment both the virtual read pointer and the auxiliary read pointer after performing the read operation.

In an exemplary embodiment, the control unit determines the operating mode as a normal mode if an entry indicated by the virtual write pointer and an entry indicated by the virtual read pointer are included in different one-port memories. The control unit may determine the operating mode as a first conflict mode if an entry indicated by the virtual write pointer and an entry indicated by the virtual read pointer are included in a same one-port memory, and the virtual read pointer precedes the virtual write pointer or the virtual read pointer catches up to the virtual write pointer such that the virtual write pointer and the virtual read pointer indicate a same entry. The control unit may determine the operating mode as a second conflict mode if an entry indicated by the virtual write pointer and an entry indicated by the virtual read pointer are included in a same one-port memory, and the virtual write pointer precedes the virtual read pointer or the virtual write pointer catches up to the virtual read pointer such that the virtual write pointer and the virtual read pointer indicate a same entry.

The control unit may store the data in an entry indicated by the virtual write pointer in response to the write command in the normal mode.

The control unit may store the data in an entry indicated by the auxiliary write pointer in response to the write command in the first conflict mode.

The control unit may output a full signal through the write channel in response to the write command in the second conflict mode. The full signal indicates that the FIFO memory device is full.

The control unit may further include a mode switch pointer and a read flag, and the control unit may set up the mode switch pointer to indicate an entry indicated by the virtual write pointer when the operating mode is switched from the normal mode to the first conflict mode, set the read flag to a first value when the control unit reads the data from the main FIFO unit in response to the read command, and set the read flag to a second value when the control unit reads the data from the auxiliary FIFO unit in response to the read command.

When the control unit receives the read command while the read flag has the first value, the control unit may read the data from an entry indicated by the virtual read pointer if the virtual read pointer and the mode switch pointer indicate different entries, and read the data from an entry indicated by the auxiliary read pointer, releases the mode switch pointer, and switch the read flag to the second value if the virtual read pointer and the mode switch pointer indicate a same entry.

The control unit may switch the operating mode from the second conflict mode to the normal mode if the virtual read pointer and the mode switch pointer indicate a same entry in the second conflict mode.

When the control unit receives the read command while the read flag has the second value, the control unit may read the data from an entry indicated by the auxiliary read pointer, and if the control unit reads the data from the last entry of the dual-port memory, the control unit may switch the read flag to the first value.

The control unit may perform at least one of a power gating and a clock gating on the first through the N-th one-port memories except for a one-port memory including an entry indicated by the virtual write pointer and a one-port memory including an entry indicated by the virtual read pointer.

In an exemplary embodiment, the control unit performs the write operation and the read operation aperiodically in response to the write command the read command received aperiodically.

In an exemplary embodiment, the control unit performs the write operation and the read operation asynchronously.

In an exemplary embodiment, the control unit performs the write operation and the read operation simultaneously when the control unit receives the write command and the read command at the same time.

According to an exemplary embodiment of the inventive concept, an electronic apparatus includes a plurality of peripheral devices and a processor. Each of the peripheral devices includes a FIFO memory device, and transmits and receives data using the FIFO memory device. The processor controls the plurality of peripheral devices. The FIFO memory device includes first through N-th one-port memories, each of which including M entries, where N and M are integers greater than or equal to two. The auxiliary FIFO unit includes one dual-port memory having M entries. The control unit performs a write operation by receiving a write command and data and storing the data in one of the main FIFO unit and the auxiliary FIFO unit based on an operating mode, and performs a read operation by receiving a read command and reading the data from one of the main FIFO unit and the auxiliary FIFO unit based on the operating mode. The control unit may receive the write command and the data through a write channel. After the data is read, the control unit may output the data through a read channel.

When the operating mode is a normal mode the control unit may read from or write to the main FIFO unit. When the operating mode is a first conflict mode the control unit may read from or write to the auxiliary FIFO unit. When the operating mode is a second conflict mode the control unit may output a signal indicating the FIFO memory device is full.

The normal mode may occur when a read pointer and a write pointer point to a different one of the one-port memories. The first conflict mode may occur when the read pointer and the write pointer point to a same one of the one-port memories and the read pointer precedes the write pointer. The second conflict mode may occur when the read pointer and the write pointer point to a same one of the one-port memories and the write pointer precedes the read pointer.

According to an exemplary embodiment of the inventive concept, a FIFO memory includes a plurality of one-port memories, each one-port memory comprising at least two entries, a dual port memory comprising at least two entries, a control unit storing virtual read and write pointers for referencing the entries of the one-port memories. The control unit is configured to perform i) a read from or write to one of the one-port memories when the virtual read and write pointers point to different one-port memories, ii) a read from or write to the dual port memory when the virtual read and write pointers both point to a same one of the one-port memories and the read pointer precedes the write pointer, and iii) output of signal indicating the FIFO memory device is full when the virtual read and write pointer both point to a same one of the one-port memories and the write pointer precedes the read pointer.

The control unit may further store an auxiliary read and write pointer for referencing the entries of the dual port memory, where the virtual and auxiliary read pointers are incremented together by the control unit, and the virtual and auxiliary write pointers are incremented together by the control unit.

BRIEF DESCRIPTION OF THE DRAWINGS

Exemplary embodiments of the invention will be more clearly understood from the following detailed description in conjunction with the accompanying drawings.

FIG. 15 is a flow chart for describing a step of storing data in FIG. 14 according to an exemplary embodiment of the inventive concept.

FIGS. 16A and 16B are flow charts for describing a step of reading data in FIG. 14 according to an exemplary embodiment of the inventive concept.

FIG. 17 is a flow chart for describing a step of determining an operating mode in FIGS. 15, 16A and 16B according to an exemplary embodiment of the inventive concept.

DETAILED DESCRIPTION

Figure 1:
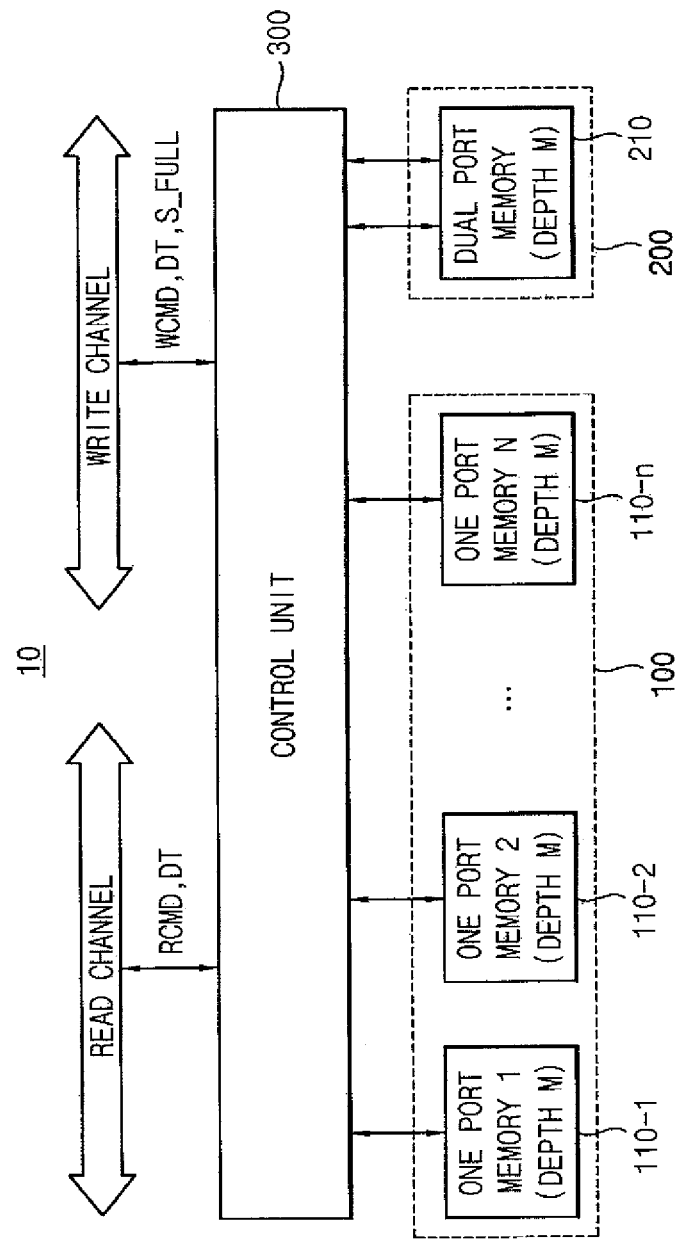
FIG. 1 is a block diagram illustrating a first-in first-out (FIFO) memory device according to an exemplary embodiment of the inventive concept.

Exemplary embodiments of the inventive concept will be described more fully with reference to the accompanying drawings. The present inventive concept may, however, be embodied in many different forms and should not be construed as limited to the embodiments set forth herein. Like reference numerals refer to like elements throughout this application.

It will be understood that when an element is referred to as being "connected" or "coupled" to another element, it can be directly connected or coupled to the other element or intervening elements may be present.

As used herein, the singular forms "a," "an" and "the" are intended to include the plural forms as well, unless the context clearly indicates otherwise.

FIG. 1 is a block diagram illustrating a first-in first-out (FIFO) memory device according to an exemplary embodiment of the inventive concept Referring to FIG. 1, a FIFO memory device 10 includes a main FIFO unit 100, an auxiliary FIFO unit 200 and a control unit 300.

The main FIFO unit 100 includes first through N-th one-port memories 110-1, 110-2, . . . , 110-n. A depth of each of the first through the N-th one-port memories 110-1, 110-2, . . . , 110-n is M. For example, a depth of M means that each of the first through the N-th one-port memories 110-1, 110-2, . . . , 110-n includes M entries. In at least one embodiment of the inventive concept, N and M are integers greater than or equal to two.

The auxiliary FIFO unit 200 includes one dual-port memory 210. In an alternate embodiment of the invention, the FIFO unit 200 may include additional dual-port memories. A depth of the dual-port memory 210 is M. For example, the dual-port memory 210 includes M entries.

The first through the N-th one-port memories 110-1, 110-2, ..., 110-n are not able to perform a write operation and a read operation simultaneously. However, the dual-port memory 210 is able to perform a write operation and a read operation simultaneously. For example, one of the ports of the dual-port memory 210 can be used to perform a read while the other port of the dual-port memory can be used to perform a write.

In an exemplary embodiment of the inventive concept, the control unit 300 is coupled with an external device (not illustrated) through a write channel and a read channel.

The control unit 300 performs a write operation when the control unit 300 receives a write command WCMD and data DT from the external device through the write channel. For example, the control unit 300 performs the write operation by receiving the write command WCMD and data DT through the write channel and storing the data DT in one of the main FIFO unit 100 and the auxiliary FIFO unit 200 based on an operating mode.

The control unit 300 performs a read operation when the control unit 300 receives a read command RCMD from the external device through the read channel. For example, the control unit 300 performs the read operation by receiving the read command RCMD through the read channel, reading the data DT from one of the main FIFO unit 100 and the auxiliary FIFO unit 200 and outputting the data DT through the read channel.

In an exemplary embodiment of the inventive concept, the control unit 300 performs the write operation on the main FIFO unit 100 only when there is little or no possibility that a conflict between the write operation and the read operation will occur on one of the first through the N-th one-port memories 110-1, 110-2, ..., 110-n. In an exemplary embodiment of the inventive concept, the control unit 300 performs the write operation on the auxiliary FIFO unit 200 even if there is a possibility that a conflict between the write operation and the read operation will occur on one of the first through the N-th one-port memories 110-1, 110-2, ..., 110-n.

In an exemplary embodiment of the inventive concept, the write command WCMD and the read command RCMD are provided from the external device aperiodically, and the control unit 300 performs the write operation and the read operation aperiodically.

In an exemplary embodiment of the inventive concept, the control unit 300 performs the write operation and the read operation based on different clock signals. Therefore, the control unit 300 may perform the write operation and the read operation asynchronously. For example, the control unit 300 may perform the write operation in response to a first clock signal (e.g., a rising edge, falling edge, etc.) and the read operation in response to a second clock signal that is out of phase with respect to the first clock signal.

In an exemplary embodiment of the inventive concept, according to an operating mode, the control unit 300 performs the write operation and the read operation on two of the first through the N-th one-port memories 110-1, 110-2, ..., 110-n, respectively, performs the write operation and the read operation on one of the first through the N-th one-port memories 110-1, 110-2, ..., 110-n and the dual-port memory 210, respectively, or performs both the write operation and the read operation on the dual-port memory 210. Therefore, the control unit 300 may perform the write operation and the read operation simultaneously or at substantially the same time when the control unit 300 receives the write command WCMD and the read command RCMD at or near the same time.

The control unit 300 may determine the operating mode based on a number of the write operations performed by the control unit 300 and a number of the read operations previously performed by the control unit 300.

In an exemplary embodiment of the inventive concept, the control unit 300 includes a virtual write pointer VWP, a virtual read pointer VRP, an auxiliary write pointer AWP and an auxiliary read pointer ARP. For example, the control unit 300 may include a register storing the pointers or the register may be disposed outside the control unit 300. As will be described below for at least one exemplary embodiment of the inventive concept, the control unit 300 determines the operating mode and selects a memory among the first through the N-th one-port memories 110-1, 110-2, ..., 110-n and the dual-port memory 210 on which the control unit 300 performs the write operation and/or the read operation.

FIGS. 2 to 13 are diagrams for describing an exemplary operation of the FIFO memory device of FIG. 1.

For ease of explanation, the main FIFO unit 100 includes first through fourth one-port memories 110-1, 110-2, 110-3 and 110-4 (e.g., N=4), and each of the first through the fourth one-port memories 110-1, 110-2, 110-3 and 110-4 and the dual-port memory 210 includes four entries (e.g., M=4) in FIGS. 2 to 13. However, embodiments of the inventive concept are not limited thereto. For example, in at least one exemplary embodiment of the inventive concept, N and M are any integer greater than or equal to two.

In FIGS. 2 to 13, shaded entries among entries of the first through the fourth one-port memories 110-1, 110-2, 110-3 and 110-4 and the dual-port memory 210 represent entries storing data DT that has not yet been read out.

Figure 2:
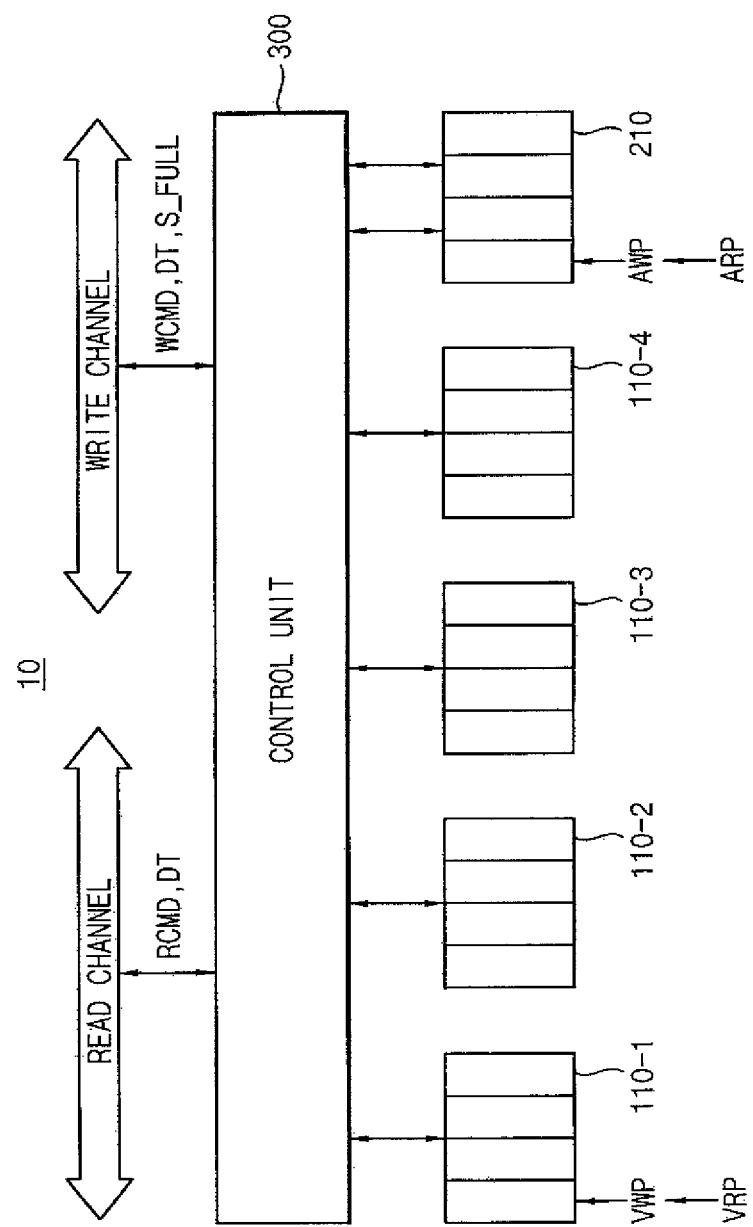
FIG. 2 is a diagram for describing an initial state of the FIFO memory device of FIG. 1.

FIG. 2 is a diagram for describing an initial state of the FIFO memory device 10 of FIG. 1.

Referring to FIG. 2, in an initial state of the FIFO memory device 10, all entries of the first through the fourth one-port memories 110-1, 110-2, 110-3 and 110-4 and the dual-port memory 210 are empty. The virtual write pointer VWP and the virtual read pointer VRP indicate a first entry of the first one-port memory 110-1. The auxiliary write pointer AWP and the auxiliary read pointer ARP indicate a first entry of the dual-port memory 210.

The virtual write pointer VWP and the virtual read pointer VRP may circularly indicate entries of the first through the N-th one-port memories 110-1, 110-2, ..., 110-n from a first entry of the first one-port memory 110-1 to a last entry of the N-th one-port memory 110-n. For example, the virtual write pointer VWP and the virtual read pointer VRP may point to the first entry of the first one-port memory 110-1 after indicating the last entry of the N-th one-port memory 110-n. For example, after the virtual write pointer VWP or the virtual read pointer VRP points to the last entry of the last one-port memory, and the corresponding pointer is incremented, it may point to a first entry of the first one-port memory.

The auxiliary write pointer AWP and the auxiliary read pointer ARP may circularly point to entries of the dual-port memory 210 from a first entry of the dual-port memory 210 to a last entry of the dual-port, memory 210. For example, the auxiliary write pointer AWP and the auxiliary read pointer ARP may indicate the first entry of the dual-port memory 210 after indicating the last entry of the dual-port memory 210. For example, after the auxiliary write pointer AWP or the auxiliary read pointer ARP point to the last entry of the dual-port memory 210, and the corresponding pointer is incremented, it may point to the first entry of the dual-port memory 210. A modulus operation may be performed on a value of the respective pointers to ensure that they do not point outside the available memories or entries.

The control unit 300 may increment both the virtual write pointer VWP and the auxiliary write pointer AWP after performing the write operation regardless of whether the control unit 300 stores the data DT in the main FIFO unit 100 or in the auxiliary FIFO unit 200. The control unit 300 may increment both the virtual read pointer VRP and the auxiliary read pointer ARP after performing the read operation regardless of whether the control unit 300 reads the data DT from the main FIFO unit 100 or from the auxiliary FIFO unit 200.

The control unit 300 may determine the operating mode based on the virtual write pointer VWP and the virtual read pointer VRP.

Figure 3:
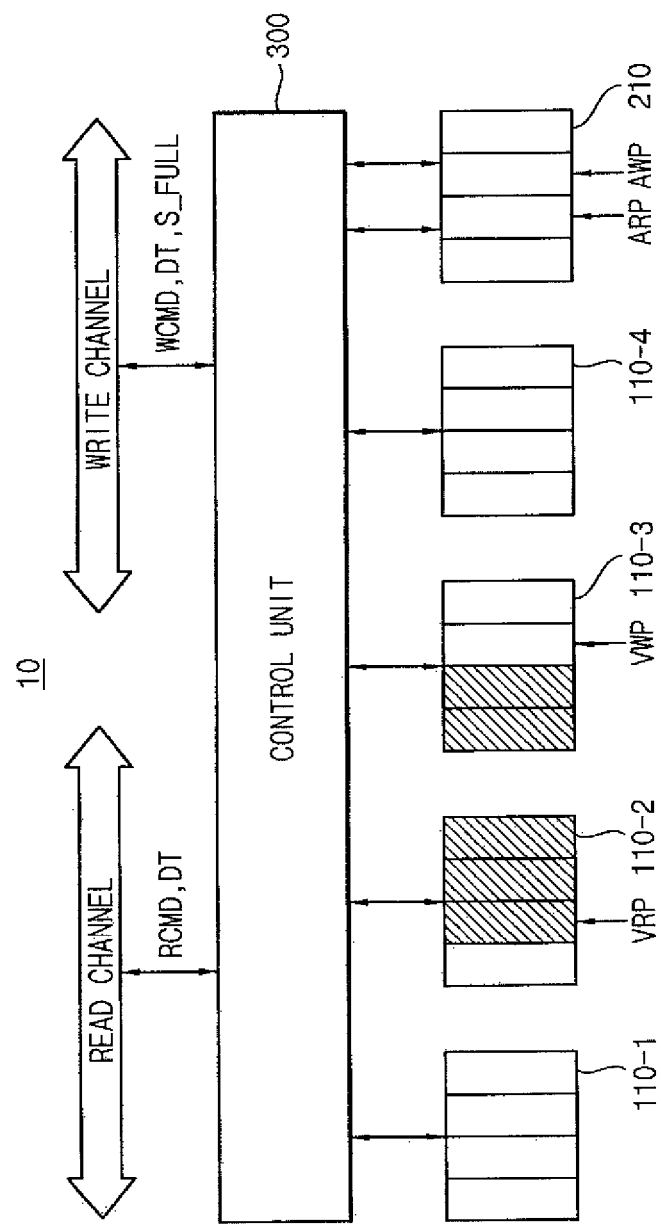
FIGS. 3, 4 and 5 are diagrams for describing determination of an operating mode of a control unit included in the FIFO memory device of FIG. 1 according to an exemplary embodiment of the inventive concept.
Figure 4:
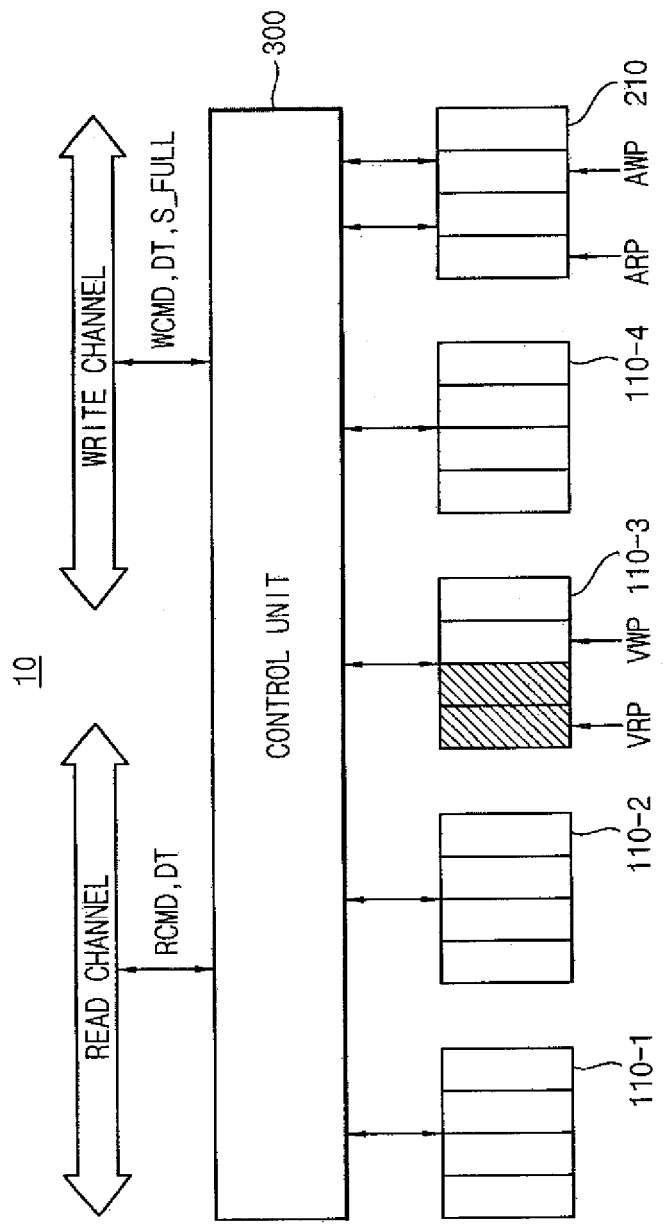
Figure 5:
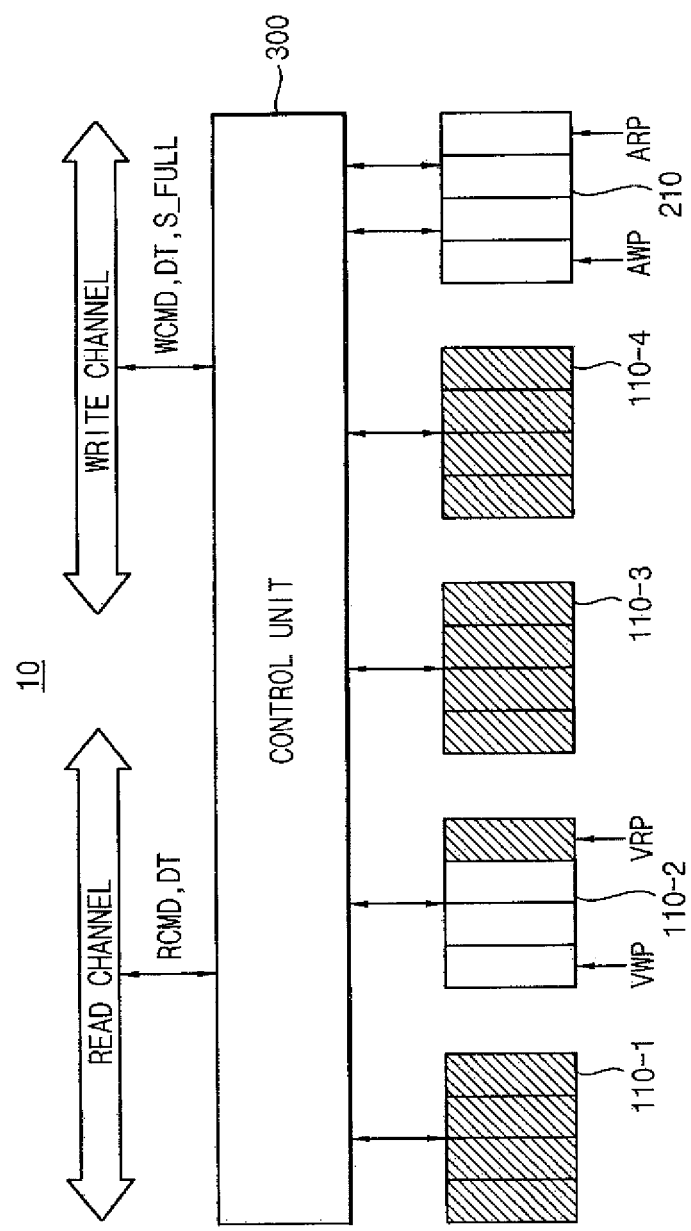

FIGS. 3, 4 and 5 are diagrams for describing a determination of an operating mode of a control unit included in the FIFO memory device of FIG. 1 according to an exemplary embodiment of the inventive concept.

FIG. 3 represents an example where the control unit 300 determines the operating mode as a normal mode. FIG. 4 represents an example where the control unit 300 determines the operating mode as a first conflict mode. FIG. 5 represents an example where the control unit 300 determines the operating mode as a second conflict mode.

FIG. 3 represents a state of the FIFO memory device 10 after the control unit 300 performed the write operation ten times and the read operation five times from the initial state.

Therefore, as illustrated in FIG. 3, the data DT are stored in from a second entry of the second one-port memory 110-2 to a second entry of the third one-port memory 110-3 in the main FIFO unit 100, the virtual write pointer VWP indicates a third entry of the third one-port memory 110-3, the virtual read pointer VRP indicates a second entry of the second one-port memory 110-2, the auxiliary write pointer AWP indicates a third entry of the dual-port memory 210 and the auxiliary read pointer ARP indicates a second entry of the dual-port memory 210.

As illustrated in FIG. 3, the control unit 300 may determine the operating mode as the normal mode if an entry indicated by the virtual write pointer VWP and an entry indicated by the virtual read pointer VRP are included in different one-port memories.

In the normal mode, the control unit 300 performs the write operation on the entry indicated by the virtual write pointer VWP and the read operation on the entry indicated by the virtual read pointer VRP simultaneously or at substantially the same time since the entry indicated by the virtual write pointer VWP and the entry indicated by the virtual read pointer VRP are included in different one-port memories.

Therefore, in the normal mode, the control unit 300 stores the data DT in the entry indicated by the virtual write pointer VWP in response to the write command WCMD.

FIG. 4 represents a state of the FIFO memory device 10 after the control unit 300 performed the read operation three more times from the state of FIG. 3.

If the control unit 300 receives the read command RCMD three more times from the state of FIG. 3, the control unit 300 keeps the operating mode as the normal mode and performs the read operation on a second entry of the second one-port memory 110-2, a third entry of the second one-port memory 110-2 and a fourth entry of the second one-port memory 110-2 consecutively.

Therefore, as illustrated in FIG. 4, the data DT are stored in from a first entry of the third one-port memory 110-3 to a second entry of the third one-port memory 110-3 in the main FIFO unit 100, the virtual write pointer VWP indicates a third entry of the third one-port memory 110-3, the virtual read pointer VRP indicates a first entry of the third one-port memory 110-3, the auxiliary write pointer AWP indicates a third entry of the dual-port memory 210 and the auxiliary read pointer ARP indicates a first entry of the dual-port memory 210.

As illustrated in FIG. 4, the control unit 300 determines the operating mode as the first conflict mode if an entry indicated by the virtual write pointer VWP and an entry indicated by the virtual read pointer VRP are included in a same one-port memory, and the virtual read pointer VRP precedes the virtual write pointer VWP or the virtual read pointer VRP catches up to the virtual write pointer VWP such that the virtual write pointer VWP and the virtual read pointer VRP indicate a same entry.

In the first conflict mode, all entries of the first through the N-th one-port memories 110-1, 110-2, . . . , 110-n except for one-port memory including both an entry indicated by the virtual write pointer VWP and an entry indicated by the virtual read pointer VRP are empty.

If the virtual read pointer VRP catches up to the virtual write pointer VWP such that the virtual write pointer VWP and the virtual read pointer VRP indicate a same entry, all entries of the first through the N-th one-port memories 110-1, 110-2, . . . , 110-n are empty.

The control unit 300 may determine the operating mode as the first conflict mode in the initial state since an entry indicated by the virtual write pointer VWP and an entry indicated by the virtual read pointer VRP are included in a same one-port memory and all entries of the first through the N-th one-port memories 110-1, 110-2, . . . , 110-n are empty.

In the first conflict mode, the control unit 300 does not perform the write operation on the entry indicated by the virtual write pointer VWP and the read operation on the entry indicated by the virtual read pointer VRP simultaneously since the entry indicated by the virtual write pointer VWP and the entry indicated by the virtual read pointer VRP are included in a same one-port memory.

Therefore, in the first conflict mode, the control unit 300 stores the data DT in the entry indicated by the auxiliary write pointer AWP in response to the write command WCMD. Therefore, the control unit 300 can read from an entry pointed to by the virtual read pointer VRP and write to an entry pointed to by the auxiliary write pointer AWP at the same time.

For example, if the control unit 300 receives the write command WCMD in a state of FIG. 4, the control unit 300 stores the data DT in a third entry of the dual-port memory 210, which is indicated by the auxiliary write pointer AWP, and increments both the virtual write pointer VWP and the auxiliary write pointer AWP. If the control unit 300 receives the write command WCMD again, the control unit 300 stores the data DT in a fourth entry of the dual-port memory 210, which is indicated by the auxiliary write pointer AWP, and increments both the virtual write pointer VWP and the auxiliary write pointer AWP. Therefore, the virtual write pointer VWP indicates a first entry of the fourth one-port memory 110-4, and the control unit 300 switches the operating mode to the normal mode since an entry indicated by the virtual write pointer VWP and an entry indicated by the virtual read pointer VRP are included in different one-port memories.

FIG. 5 represents a state of the FIFO memory device 10 after the control unit 300 performed the read operation two more times and the write operation ten more times from the state of FIG. 3.

If the control unit 300 receives the read command RCMD two more times while receiving the write command WCMD ten more times from the state of FIG. 3, the control unit 300 keeps the operating mode as the normal mode, performs the read operation on a second entry of the second one-port memory 110-2 and a third entry of the second one-port memory 110-2, and performs the write operation on a third entry of the third one-port memory 110-3, a fourth entry of the third one-port memory 110-3, four entries of the fourth one-port memory 110-4 and four entries of the first one-port memory 110-1.

Therefore, as illustrated in FIG. 5, the data DT are stored in from a fourth entry of the second one-port memory 110-2 to a fourth entry of the first one-port memory 110-1 in the main FIFO unit 100, the virtual write pointer VWP indicates a first entry of the second one-port memory 110-2, the virtual read pointer VRP indicates a fourth entry of the second one-port memory 110-2, the auxiliary write pointer AWP indicates a first entry of the dual-port memory 210 and the auxiliary read pointer ARP indicates a fourth entry of the dual-port memory 210.

As illustrated in FIG. 5, the control unit 300 determines the operating mode as the second conflict mode if an entry indicated by the virtual write pointer VWP and an entry indicated by the virtual read pointer VRP are included in a same one-port memory, and the virtual write pointer VWP precedes the virtual read pointer VRP or the virtual write pointer VWP catches up to the virtual read pointer VRP such that the virtual write pointer VWP and the virtual read pointer VRP indicate a same entry.

In the second conflict mode, all entries of the first through the N-th one-port memories 110-1, 110-2, ..., 110-n except for one-port memory including both an entry indicated by the virtual write pointer VWP and an entry indicated by the virtual read pointer VRP are full of the data DT.

If the virtual write pointer VWP catches up to the virtual read pointer VRP such that the virtual write pointer VWP and the virtual read pointer VRP indicate a same entry, all entries of the first through the N-th one-port memories 110-1, 110-2, ..., 110-n are full of the data DT.

In the second conflict mode, the control unit 300 does not perform the write operation on the entry indicated by the virtual write pointer VWP and the read operation on the entry indicated by the virtual read pointer VRP simultaneously since the entry indicated by the virtual write pointer VWP and the entry indicated by the virtual read pointer VRP are included in a same one-port memory.

Therefore, in the second conflict mode in an exemplary embodiment of the inventive concept, the control unit 300 outputs a full signal S_FULL to the external device through the write channel in response to the write command WCMD. For example, the control unit 300 does not perform the write operation, and instead outputs the full signal S_FULL in response to the write command WCMD in the second conflict mode until the operating mode is switched to the normal mode.

As described above, in an embodiment of the inventive concept, the control unit 300 stores the data DT in the main FIFO unit 100 in response to the write command WCMD in the normal mode, and stores the data DT in the auxiliary FIFO unit 200 in response to the write command WCMD if the operating mode is switched from the normal mode to the first conflict mode. In an exemplary embodiment of the inventive concept, the control unit 300 switches the operating mode from the first conflict mode to the normal mode after the control unit 300 stores the data DT in the last entry of the dual-port memory 210 in the first conflict mode.

When the control unit 300 receives the read command RCMD through the read channel, the control unit 300 reads the data DT that is the oldest among the data DT stored in the main FIFO unit 100 and the auxiliary FIFO unit 200 and outputs the read data DT through the read channel. In an exemplary embodiment, the control unit 300 includes a mode switch pointer MTP and a read flag R_FLAG to find the data DT that is the oldest among the data DT stored in the main FIFO unit 100 and the auxiliary FIFO unit 200.

The control unit 300 may set up the mode switch pointer MTP to indicate an entry indicated by the virtual write pointer VWP when the operating mode is switched from the normal mode to the first conflict mode.

In an exemplary embodiment of the inventive concept, the control unit 300 stores the data DT in the auxiliary FIFO unit 200 in the first conflict mode. Therefore, when the mode switch pointer MTP is set up, the data DT is not stored in from an entry indicated by the mode switch pointer MTP in the main FIFO unit 100 until the operating mode is switched from the first conflict mode to the normal mode.

In an exemplary embodiment of the inventive concept, the control unit 300 sets the read flag R_FLAG to a first value when the control unit 300 reads the data DT from the main FIFO unit 100 in response to the read command RCMD, and sets the read flag R_FLAG to a second value when the control unit 300 reads the data DT from the auxiliary FIFO unit 200 in response to the read command RCMD. Therefore, the read flag R_FLAG has the first value if the control unit 300 recently performed the read operation on the main FIFO unit 100, and the read flag R_FLAG has the second value if the control unit 300 recently performed the read operation on the auxiliary FIFO unit 200. In at least one exemplary embodiment of the inventive concept, the first value is '0' and the second value is '1'.

When the control unit 300 receives the read command RCMD through the read channel, the control unit 300 may determine whether the read flag R_FLAG has the first value or the second value.

When the control unit 300 receives the read command RCMD while the read flag R_FLAG has the first value, the control unit 300 determines whether the virtual read pointer VRP and the mode switch pointer MTP indicate a same entry.

If the virtual read pointer VRP and the mode switch pointer MTP indicate different entries, some of the data DT has not yet been read out in the main FIFO unit 100. Therefore, the control unit 300 reads the data DT from an entry indicated by the virtual read pointer VRP and outputs the read data DT through the read channel.

If the virtual read pointer VRP and the mode switch pointer MTP indicate a same entry, all the data DT stored in the main FIFO unit 100 was already read out. Therefore, the control unit 300 reads the data DT from an entry indicated by the auxiliary read pointer ARP to output the read data DT through the read channel, releases the mode switch pointer MTP, and switches the read flag R_FLAG to the second value. The released mode switch pointer MTP does not indicate any entry of the main FIFO unit 100.

In an exemplary embodiment, when the control unit 300 receives the read command RCMD while the read flag R_FLAG has the second value, the control unit 300 reads the data DT from an entry indicated by the auxiliary read pointer ARP and outputs the read data DT through the read channel. In addition, if the auxiliary read pointer ARP indicates the last entry of the dual-port memory 210 (e.g., the control unit 300 reads the data DT from the last entry of the dual-port memory 210), the control unit 300 switches the read flag R_FLAG to the first value.

FIGS. 6 to 11 are diagrams for describing an operation of the FIFO memory device of FIG. 1 after the operating mode is switched to a first conflict mode.

Figure 6:
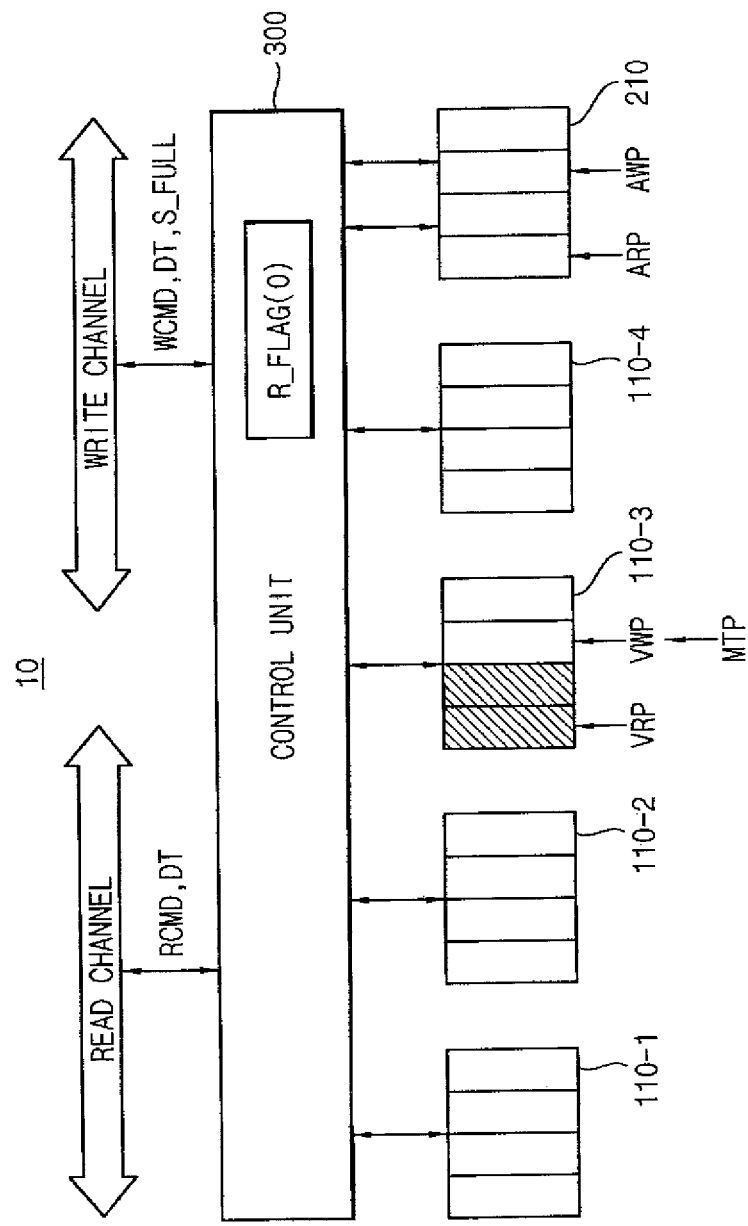
FIGS. 6 to 11 are diagrams for describing an exemplary operation of the FIFO memory device of FIG. 1 after the operating mode is switched to a first conflict mode.

FIG. 6 represents a state of the FIFO memory device 10 after the control unit 300 performed the read operation three more times from the state of FIG. 3.

The FIFO memory device 10 is in the normal mode in the state of FIG. 3.

If the control unit 300 receives the read command RCMD three more times from the state of FIG. 3, the control unit 300 keeps the operating mode as the normal mode and performs the read operation on a second entry of the second one-port memory 110-2, a third entry of the second one-port memory 110-2 and a fourth entry of the second one-port memory 110-2 consecutively.

Therefore, as illustrated in FIG. 6, the data DT are stored in from a first entry of the third one-port memory 110-3 to a second entry of the third one-port memory 110-3 in the main FIFO unit 100, the virtual write pointer VWP indicates a third entry of the third one-port memory 110-3, the virtual read pointer VRP indicates a first entry of the third one-port memory 110-3, the auxiliary write pointer AWP indicates a third entry of the dual-port memory 210 and the auxiliary read pointer ARP indicates a first entry of the dual-port memory 210.

Since an entry indicated by the virtual write pointer VWP and an entry indicated by the virtual read pointer VRP are included in a same one-port memory and the virtual read pointer VRP precedes the virtual write pointer VWP, the control unit 300 switches the operating mode from the normal mode to the first conflict mode and sets up the mode switch pointer MTP to indicate an entry indicated by the virtual write pointer VWP. In addition, as illustrated in FIG. 6, the read flag R_FLAG has the first value (e.g., '0') since the control unit 300 performed the read operation on the main FIFO unit 100.

Figure 7:
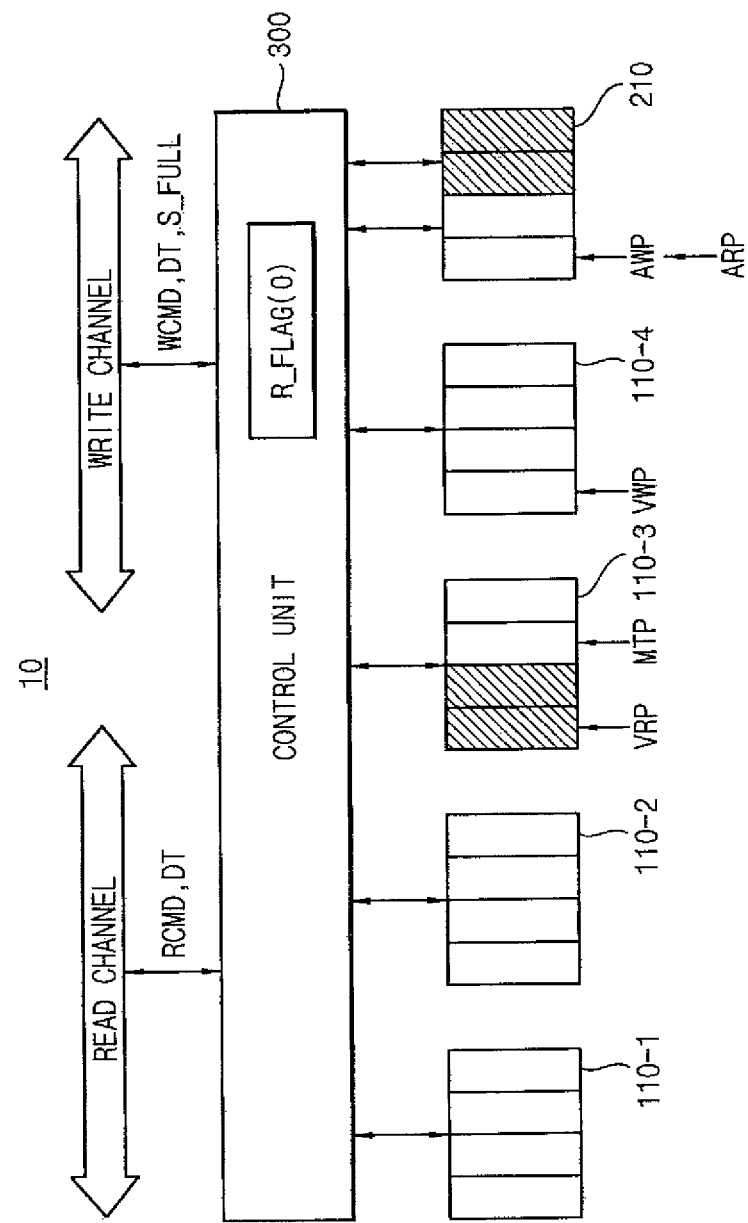

FIG. 7 represents a state of the FIFO memory device 10 after the control unit 300 performed the write operation two more times from the state of FIG. 6.

The FIFO memory device 10 is in the first conflict mode in the state of FIG. 6.

If the control unit 300 receives the write command WCMD two more times from the state of FIG. 6, the control unit 300 performs the write operation on a third entry of the dual-port memory 210 and a fourth entry of the dual-port memory 210 indicated by the auxiliary write pointer AWP.

After that, as illustrated in FIG. 7, the virtual write pointer VWP and the auxiliary write pointer AWP are incremented two times such that the virtual write pointer VWP indicates a first entry of the fourth one-port memory 110-4 and the auxiliary write pointer AWP indicates a first entry of the dual-port memory 210. Therefore, the control unit 300 switches the operating mode from the first conflict mode to the normal mode since an entry indicated by the virtual write pointer VWP and an entry indicated by the virtual read pointer VRP are included in different one-port memories.

Figure 8:
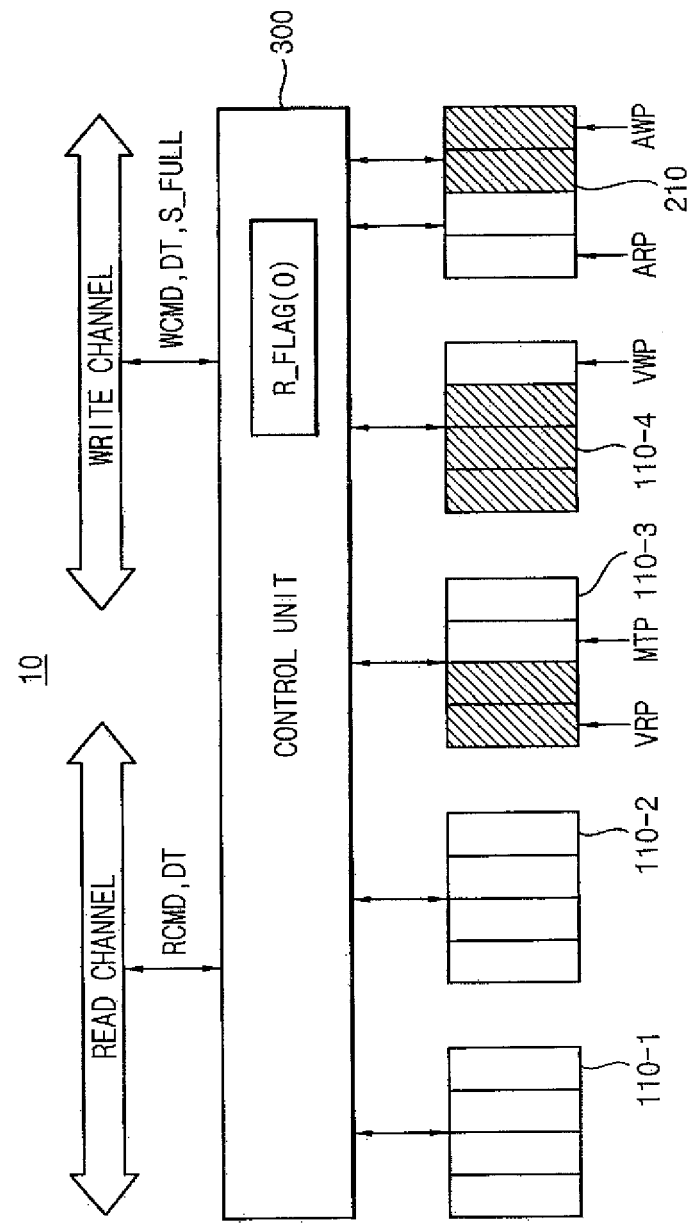

FIG. 8 represents a state of the FIFO memory device 10 after the control unit 300 performed the write operation three more times from the state of FIG. 7.

The FIFO memory device 10 is in the normal mode in the state of FIG. 7.

If the control unit 300 receives the write command WCMD three more times from the state of FIG. 7, the control unit 300 performs the write operation on a first entry of the fourth one-port memory 110-4, a second entry of the fourth one-port memory 110-4 and a third entry of the fourth one-port memory 110-4 indicated by the virtual write pointer VWP.

After that, as illustrated in FIG. 8, the virtual write pointer VWP and the auxiliary write pointer AWP are incremented three times such that the virtual write pointer VWP indicates a fourth entry of the fourth one-port memory 110-4 and the auxiliary write pointer AWP indicates a fourth entry of the dual-port memory 210. The control unit 300 keeps the operating mode as the normal mode since an entry indicated by the virtual write pointer VWP and an entry indicated by the virtual read pointer VRP are included in different one-port memories.

Figure 9:
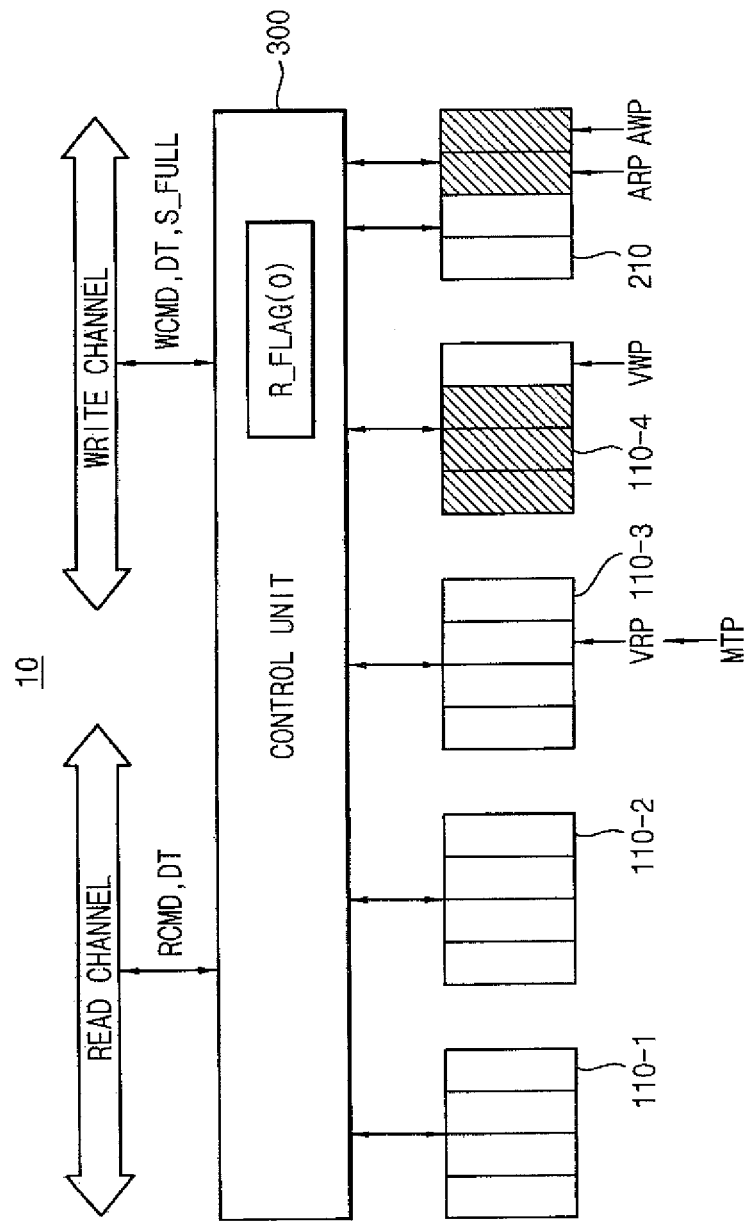

FIG. 9 represents a state of the FIFO memory device 10 after the control unit 300 performed the read operation two more times from the state of FIG. 8.

While the control unit 300 receives the read command RCMD two more times from the state of FIG. 8, the read flag R_FLAG has the first value (e.g., '0') and the virtual read pointer VRP and the mode switch pointer MTP indicate different entries. Therefore, the control unit 300 performs the read operation on a first entry of the third one-port memory 110-3 and a second entry of the third one-port memory 110-3 indicated by the virtual read pointer VRP.

After that, as illustrated in FIG. 9, the virtual read pointer VRP and the auxiliary read pointer ARP are incremented two times such that the virtual read pointer VRP indicates a third entry of the third one-port memory 110-3, which is a same entry indicated by the mode switch pointer MTP, and the auxiliary read pointer ARP indicates a third entry of the dual-port memory 210. In addition, as illustrated in FIG. 9, the read flag R_FLAG is kept at the first value (e.g., '0') since the control unit 300 performed the read operation on the main FIFO unit 100.

Figure 10:
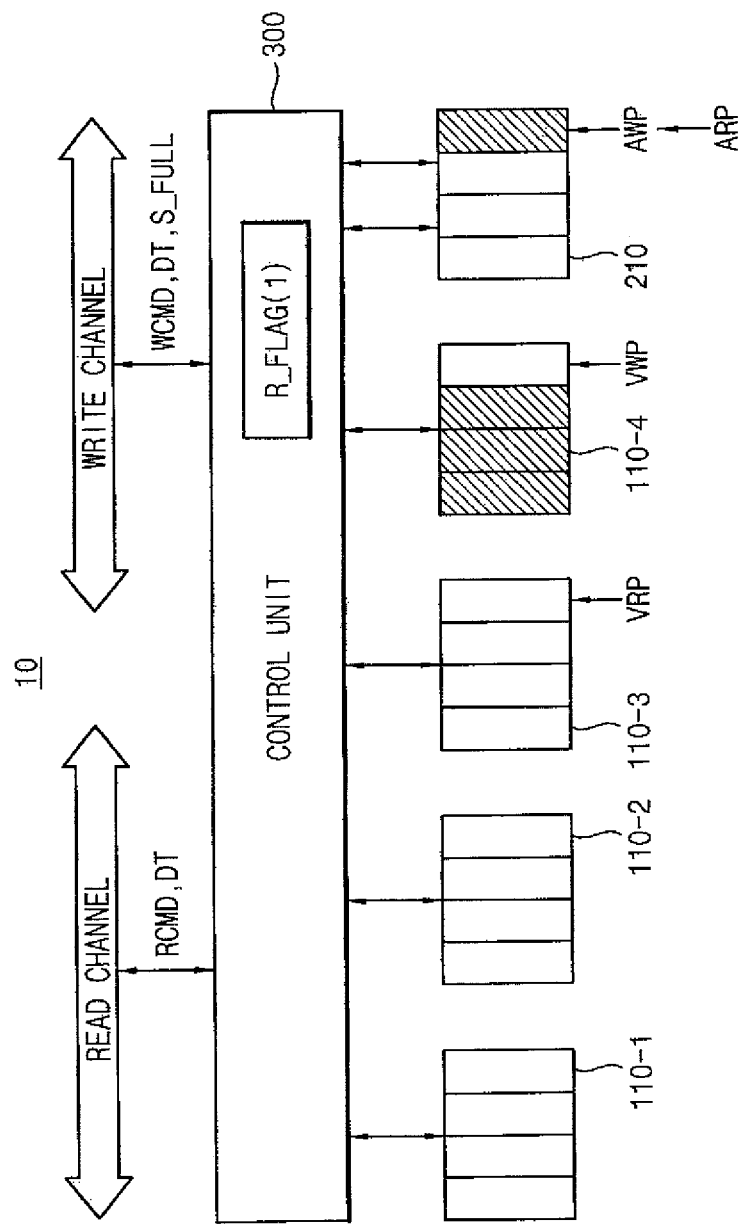

FIG. 10 represents a state of the FIFO memory device 10 after the control unit 300 performed the read operation once more from the state of FIG. 9.

Since the read flag R_FLAG has the first value (e.g., '0') and the virtual read pointer VRP and the mode switch pointer MTP indicate a same entry in the state of FIG. 9, the control unit 300 performs the read operation on a third entry of the dual-port memory 210 indicated by the auxiliary read pointer ARP in response to the read command RCMD, releases the mode switch pointer MTP, and switches the read flag R_FLAG to the second value (e.g., '1').

After that, as illustrated in FIG. 10, the virtual read pointer VRP and the auxiliary read pointer ARP are incremented once such that the virtual read pointer VRP indicates a fourth entry of the third one-port memory 110-3 and the auxiliary read pointer ARP indicates a fourth entry of the dual-port memory 210.

Figure 11:
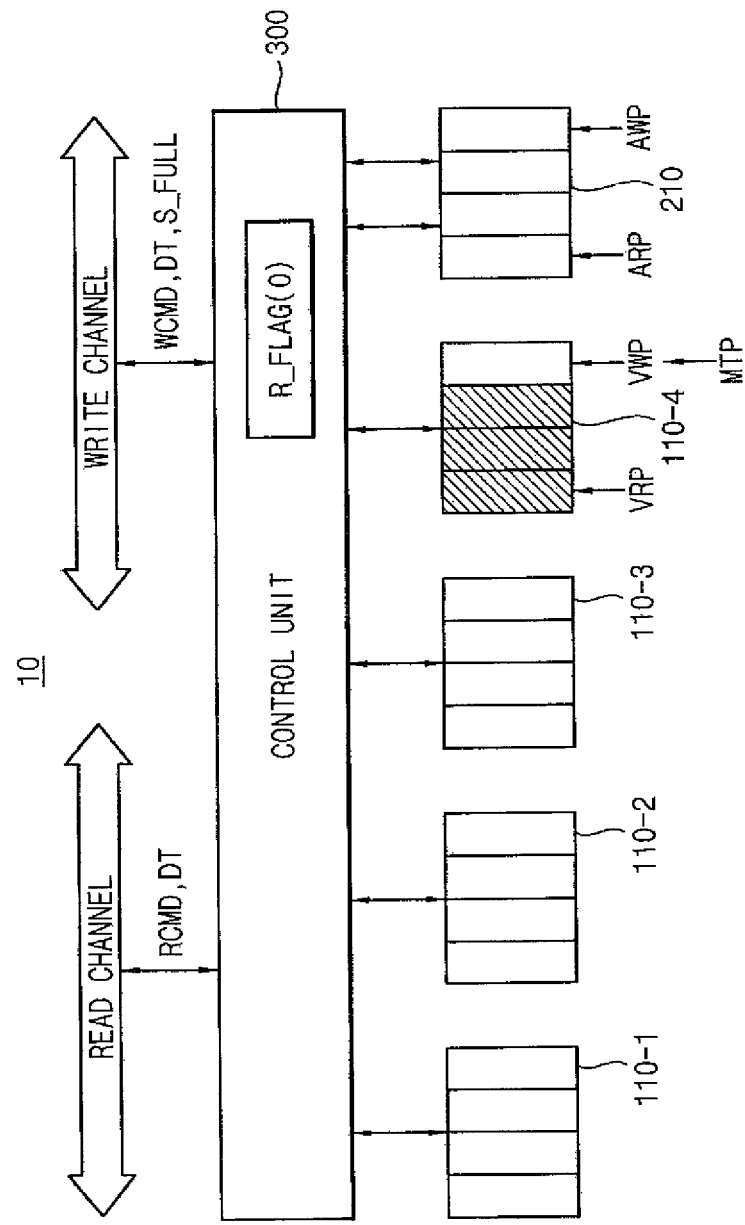

FIG. 11 represents a state of the FIFO memory device 10 after the control unit 300 performed the read operation once more from the state of FIG. 10.

Since the read flag R_FLAG has the second value (e.g., '1') in the state of FIG. 10, the control unit 300 performs the read operation on a fourth entry of the dual-port memory 210 indicated by the auxiliary read pointer ARP in response to the read command RCMD. In addition, since the auxiliary read pointer ARP indicates the last entry of the dual-port memory 210 (e.g., the control unit 300 reads the data DT from the last entry of the dual-port memory 210), the control unit 300 switches the read flag R_FLAG to the first value (e.g., '0').

After that, as illustrated in FIG. 11, the virtual read pointer VRP and the auxiliary read pointer ARP are incremented once such that the virtual read pointer VRP indicates a first entry of the fourth one-port memory 110-4 and the auxiliary read pointer ARP indicates a first entry of the dual-port memory 210. In addition, since an entry indicated by the virtual write pointer VWP and an entry indicated by the virtual read pointer VRP are included in a same one-port memory and the virtual read pointer VRP precedes the virtual write pointer VWP, the control unit 300 switches the operating mode from the normal mode to the first conflict mode and sets up the mode switch pointer MTP to indicate an entry indicated by the virtual write pointer VWP, which is a fourth entry of the fourth one-port memory 110-4.

Figure 12:
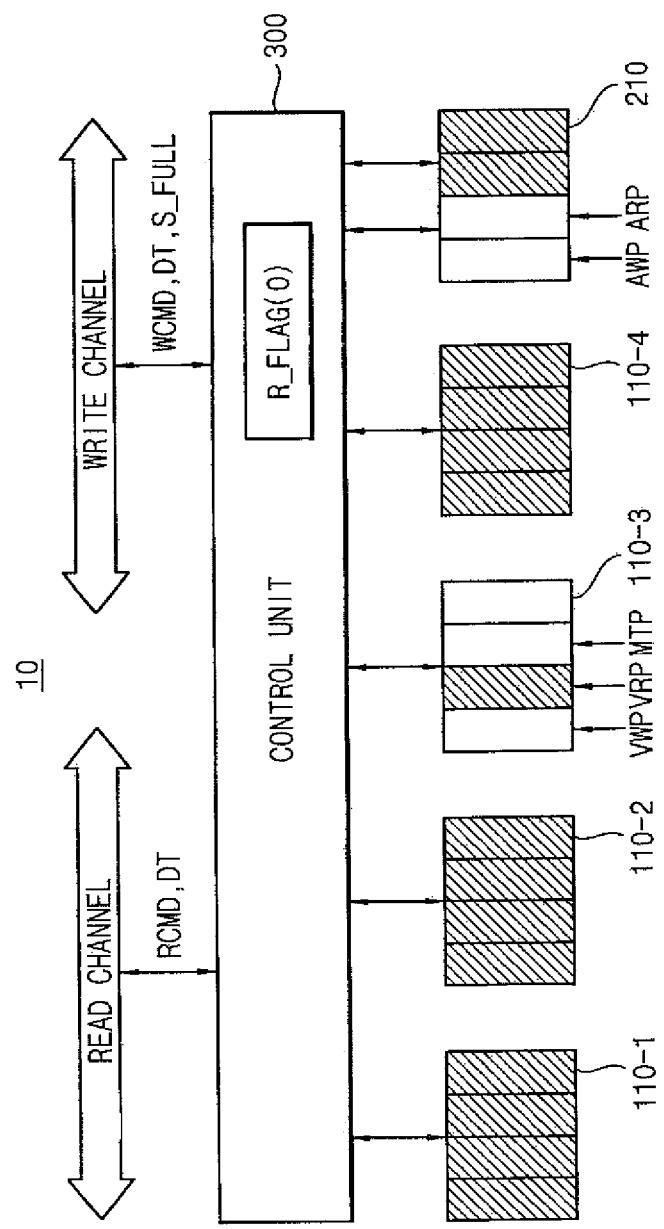
FIGS. 12 and 13 are diagrams for describing an exemplary operation of the FIFO memory device of FIG. 1 after the operating mode is switched to a second conflict mode.
Figure 13:
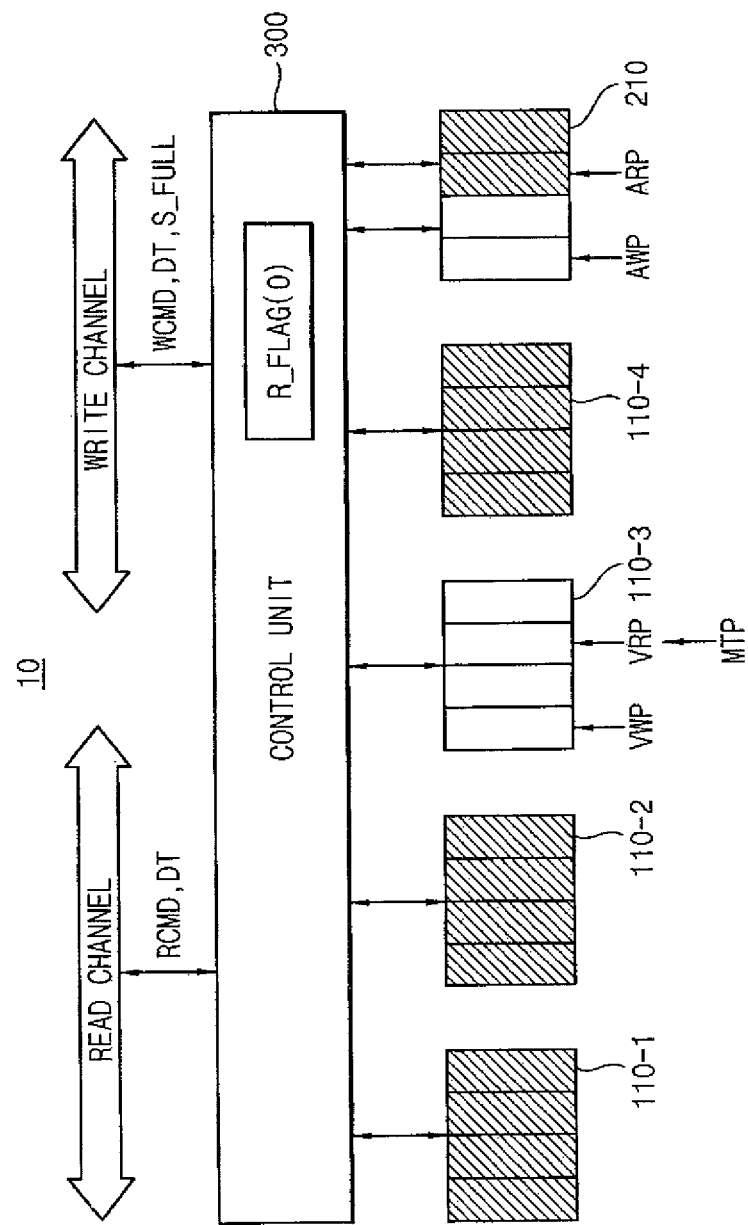

FIGS. 12 and 13 are diagrams for describing an exemplary operation of the FIFO memory device of FIG. 1 after the operating mode is switched to a second conflict mode.

FIG. 12 represents a state of the FIFO memory device 10 after the control unit 300 performed the read operation once more and the write operation nine more times from the state of FIG. 8.

The FIFO memory device 10 is in the normal mode in the state of FIG. 8.

Since the read flag R_FLAG has the first value (e.g., '0') and the virtual read pointer VRP and the mode switch pointer MTP indicate different entries, the control unit 300 performs the read operation on a first entry of the third one-port memory 110-3 indicated by the virtual read pointer VRP in response to the read command ROM.

After that, as illustrated in FIG. 12, the virtual read pointer VRP and the auxiliary read pointer ARP are incremented once such that the virtual read pointer VRP indicates a second entry of the third one-port memory 110-3 and the auxiliary read painter ARP indicates a second entry of the dual-port memory 210. In addition, as illustrated in FIG. 12, the read flag R_FLAG is kept at the first value (e.g., '0') since the control unit 300 performed the read operation on the main FIFO unit 100. The control unit 300 keeps the operating mode as the normal mode since an entry indicated by the virtual write pointer VWP and an entry indicated by the virtual read pointer VRP are included in different one-port memories.

In addition, while the control unit 300 receives the write command WCMD nine more times, the operating mode is kept as the normal mode. Therefore, the control unit 300 performs the write operation on from a fourth entry of the fourth one-port memory 110-4 to a fourth entry of the second one-port memory 110-2 indicated by the virtual write pointer VWP.

After that, as illustrated in FIG. 12, the virtual write pointer VWP and the auxiliary write pointer AWP are incremented nine times such that the virtual write pointer VWP indicates a first entry of the third one-port memory 110-3 and the auxiliary write pointer AWP indicates a first entry of the dual-port memory 210. Therefore, the control unit 300 switches the operating mode from the normal mode to the second conflict mode since an entry indicated by the virtual write pointer VWP and an entry indicated by the virtual read pointer VRP are included in a same one-port memory and the virtual write pointer VWP precedes the virtual read pointer VRP.

FIG. 13 represents a state of the FIFO memory device 10 after the control unit 300 performed the read operation once more from the state of FIG. 12.

Since the read flag R_FLAG has the first value (e.g., '0') and the virtual read pointer VRP and the mode switch pointer MTP indicate different entries, the control unit 300 performs the read operation on a second entry of the third one-port memory 110-3 indicated by the virtual read pointer VRP in response to the read command RCMD.

After that, as illustrated in FIG. 13, the virtual read pointer VRP and the auxiliary read pointer ARP are incremented once such that the virtual read pointer VRP indicates a third entry of the third one-port memory 110-3, which is a same entry indicated by the mode switch pointer MTP, and the auxiliary read pointer ARP indicates a third entry of the dual-port memory 210. In addition, as illustrated in FIG. 13, the read flag R_FLAG is kept at the first value (e.g., '0') since the control unit 300 performed the read operation on the main FIFO unit 100.

In an exemplary embodiment of the inventive concept, as illustrated in FIG. 13, if the virtual read pointer VRP and the mode switch pointer MTP indicate a same entry in the second conflict mode, the control unit 300 keeps the operating mode as the second conflict mode. In this example, the control unit 300 stops performing the write operation and outputs the full signal S_FULL to the external device in response to the write command WCMD until the operating mode is switched to the normal mode. When the control unit 300 receives the read command RCMD two more times, the control unit 300 performs the read operation on a third entry of the dual-port memory 210 and a fourth entry of the dual-port memory 210, and increments the virtual read pointer VRP and the auxiliary read pointer ARP two times such that the virtual read pointer VRP indicates a first entry of the fourth one-port memory 110-4 and the auxiliary read pointer ARP indicates a first entry of the dual-port memory 210. Since an entry indicated by the virtual write pointer VWP and an entry indicated by the virtual read pointer VRP are included in different one-port memories, the control unit 300 switches the operating mode from the second conflict mode to the normal mode and restarts performing the write operation in response to the write command WCMD.

Referring to FIG. 13, if the virtual read pointer VRP and the mode switch pointer MTP indicate a same entry in the second conflict mode, the third one-port memory 110-3, which includes an entry indicated by the virtual read pointer VRP, does not store the data DT to be read out. Therefore, when the control unit 300 receives the read command RCMD in the state of FIG. 13, the control unit 300 performs the read operation on a third entry of the dual-port memory 210 indicated by the auxiliary read pointer ARP. As such, a conflict between the write operation and the read operation do not occur on the third one-port memories memory even though the control unit 300 performs the write operation on an entry indicated by the virtual write pointer VWP in response to the write command WCMD, Therefore, in at least one embodiment of the inventive concept, as illustrated in FIG. 13, if the virtual read pointer VRP and the mode switch pointer MTP indicate a same entry in the second conflict mode, the control unit 300 switches the operating mode from the second conflict mode to the normal mode immediately. In this example, the control unit 300 performs the write operation on a first entry of the third one-port memory 110-3, which is indicated by the virtual write pointer VWP, in response to the write command WCMD even though an entry indicated by the virtual write pointer VWP and an entry indicated by the virtual read pointer VRP are included in a same one-port memory. As such, an operation speed of the FIFO memory device 10 may increase.

In an exemplary embodiment of the inventive concept, both the write operation and the read operation are not performed on the first through the N-th one-port memories 110-1, 110-2, ..., 110-n except for a one-port memory including an entry indicated by the virtual write pointer VWP and a one-port memory including an entry indicated by the virtual read pointer VRP.

Therefore, in at least one exemplary embodiment of the inventive concept, the control unit 300 performs a power gating on the first through the N-th one-port memories 110-1, 110-2, ..., 110-n except for a one-port memory including an entry indicated by the virtual write pointer VWP and a one-port memory including an entry indicated by the virtual read pointer VRP. For example, the control unit 300 cuts off a power supply to the first through the N-th one-port memories 110-1, 110-2, ..., 110-n except for a one-port memory including an entry indicated by the virtual write pointer VWP and a one-port memory including an entry indicated by the virtual read pointer VRP.

In at least one exemplary embodiment of the inventive concept, the control unit 300 performs a clock gating on the first through the N-th one-port memories 110-1, 110-2, ..., 110-n except for a one-port memory including an entry indicated by the virtual write pointer VWP and a one-port memory including an entry indicated by the virtual read pointer VRP. For example, the control unit 300 stops providing a clock signal to the first through the N-th one-port memories 110-1, 110-2, ..., 110-n except for a one-port memory including an entry indicated by the virtual write pointer VWP and a one-port memory including an entry indicated by the virtual read pointer VRP.

As described above, the FIFO memory device 10 of FIG. 1 may perform the write operation and the read operation on two of the first through the N-th one-port memories 110-1, 110-2, ..., 110-n, respectively, perform the write operation and the read operation on one of the first through the N-th one-port memories 110-1, 110-2, ..., 110-n and the dual-port memory 210, respectively, or perform both the write operation and the read operation on the dual-port memory 210 according to the operating mode. Therefore, the FIFO memory device 10 may perform the write operation and the read operation simultaneously or at substantially the same time even in an example where the write command WCMD and the read command RCMD are provided aperiodically or randomly, and in an example where the write command WCMD and the read command RCMD are provided in a fixed pattern. As such, an operation speed of the FIFO memory device 10 may increase. In addition, since the FIFO memory device 10 may perform the write operation and the read operation simultaneously or at substantially the same time with a plurality of one-port memories and only one dual-port memory, a size and power consumption of the FIFO memory device 10 may decrease. However, in an alternate embodiment of the inventive concept, additional dual-port memories may be present.

Furthermore, the FIFO memory device 10 may store the data DT in one of the main FIFO unit 100 and the auxiliary FIFO unit 200 instead of storing the data DT in both of the main FIFO unit 100 and the auxiliary FIFO unit 200 in response to the write command WCMD. Therefore, the FIFO memory device 10 may reduce power consumption.

The FIFO memory device 10 may further reduce power consumption by performing at least one of a power gating and a clock gating on the first through the N-th one-port memories 110-1, 110-2, ..., 110-n except for a one-port memory including an entry indicated by the virtual write pointer VWP and a one-port memory including an entry indicated by the virtual read pointer VRP.

Figure 14:
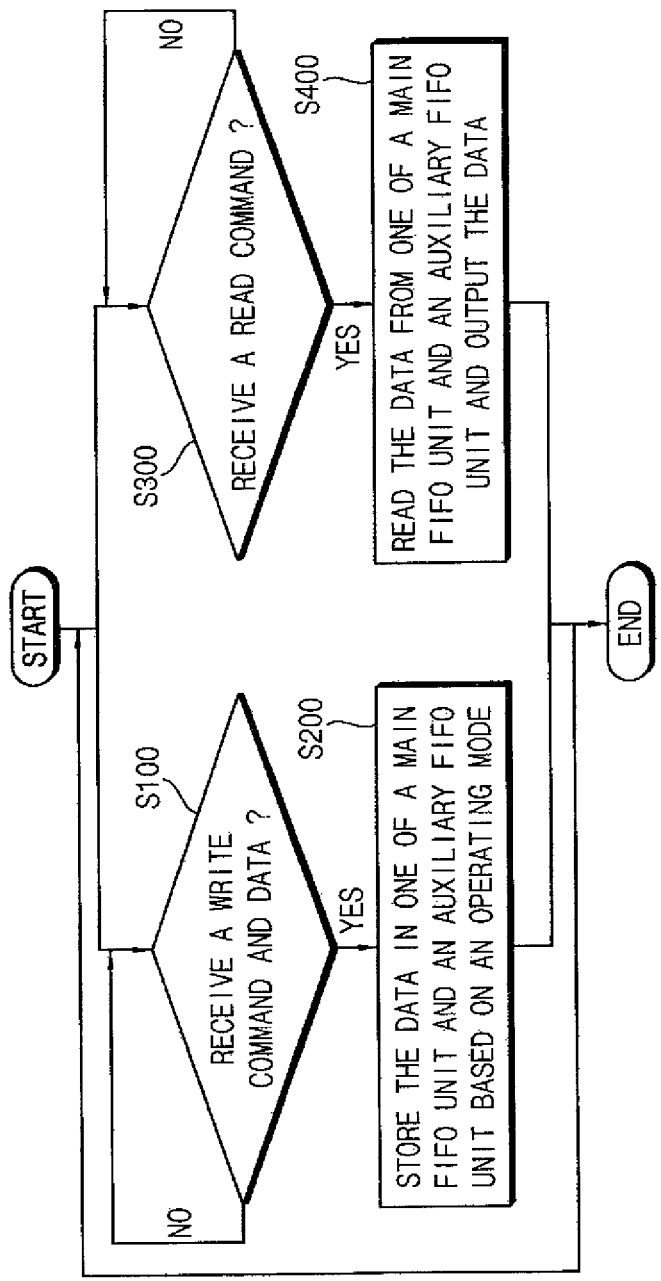
FIG. 14 is a flow chart illustrating a method of writing and reading data in a FIFO memory device according to an exemplary embodiment of the inventive concept.

FIG. 14 is a flow chart illustrating a method of writing and reading data in a FIFO memory device according to an exemplary embodiment of the inventive concept.

The method of writing and reading data in a FIFO memory device in FIG. 14 may be performed by the FIFO memory device 10 of FIG. 1.

Hereinafter, a method of writing and reading data in the FIFO memory device 10 will be described with reference to FIGS. 1 to 14.

The control unit 300 waits until it receives the write command WCMD and the data DT from the external device through the write channel (S100). When the control unit 300 receives the write command WCMD and the data DT through the write channel, the control unit 300 performs the write operation by storing the data DT in one of the main FIFO unit 100 and the auxiliary FIFO unit 200 based on an operating mode (S200). After that, the control unit 300 waits again until it receives the write command WCMD and the data DT from the external device through the write channel (S100).

The control unit 300 waits until it receives the read command RCMD from the external device through the read channel (S300). When the control unit 300 receives the read command RCMD through the read channel, the control unit 300 performs the read operation by reading the data DT from one of the main FIFO unit 100 and the auxiliary FIFO unit 200 and outputting the data DT through the read channel (S400). After that, the control unit 300 waits again until it receives the read command RCMD from the external device through the read channel (S300).

In an embodiment, the write operation, which includes a step of receiving the write command WCMD and the data DT (S100) and a step of storing the data DT (S200), and the read operation, which includes a step of receiving the read command RCMD (S300) and a step of reading and outputting the data DT (S400), is performed simultaneously or at substantially the same time. In an embodiment, the write operation, which includes a step of receiving the write command WCMD and the data DT (S100) and a step of storing the data DT (S200), and the read operation, which includes a step of receiving the read command RCMD (S300) and a step of reading and outputting the data DT (S400), are performed asynchronously.

FIG. 15 is a flow chart for describing a step of storing the data DT (S200) of FIG. 14 according to an exemplary embodiment of the inventive concept.

Referring to FIG. 15, when the control unit 300 receives the write command WCMD and the data DT through the write channel, the control unit 300 determines the operating mode (S210).

If the operating mode is the normal mode, the control unit 300 stores the data DT in the entry indicated by the virtual write pointer VWP in the main FIFO unit 100 (S220), and increments the virtual write pointer VWP and the auxiliary write pointer AWP (S250).

If the operating mode is the first conflict mode, the control unit 300 stores the data DT in the entry indicated by the auxiliary write pointer AWP in the auxiliary FIFO unit 200 (S230), and increments the virtual write pointer VWP and the auxiliary write pointer AWP (S250).

If the operating mode is the second conflict mode, the control unit 300 outputs the full signal S_FULL to the external device through the write channel without performing the write operation (S240).

After that, the control unit 300 may determine the operating mode based on the virtual write pointer VWP and the virtual read pointer VRP (S260). The step of determining the operating mode (S260) will be described below with reference to FIG. 17.

Figure 16B:
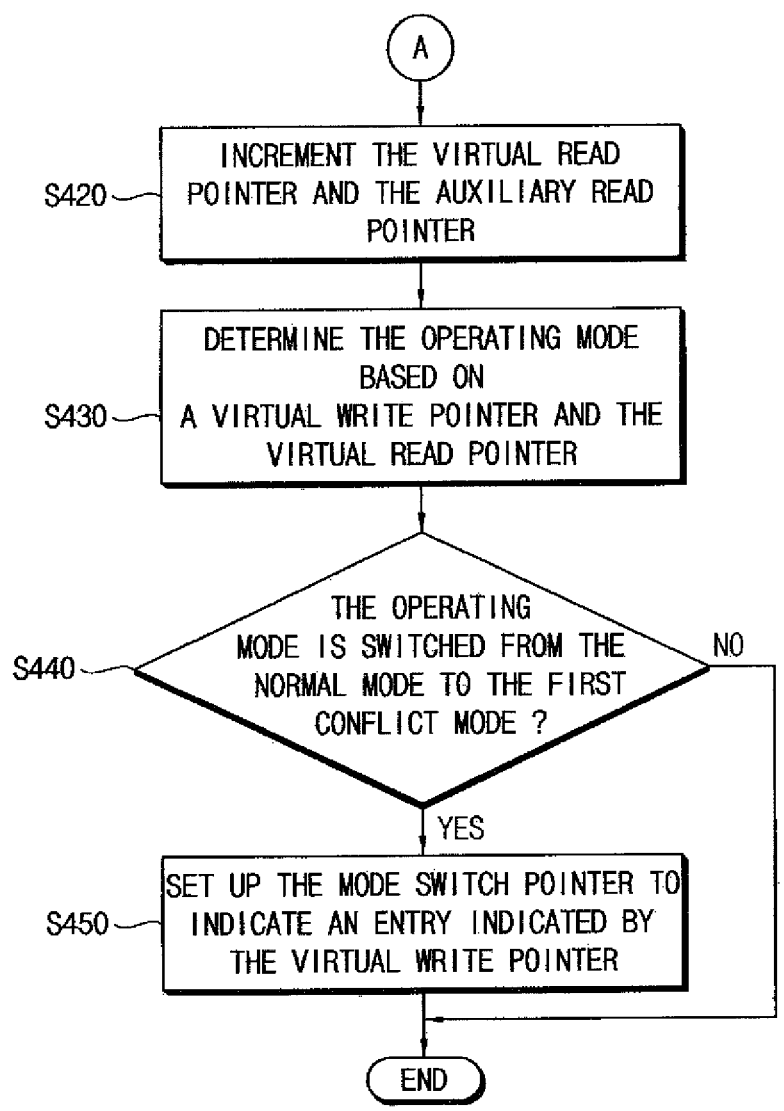

FIGS. 16A and 16B are flow charts for describing a step of reading the data DT (S400) of FIG. 14 according to an exemplary embodiment of the inventive concept.

Referring to FIGS. 16A and 16B, when the control unit 300 receives the read command RCMD through the read channel, the control unit 300 determines whether the read flag R_FLAG has the first value (e.g., '0') or the second value (e.g., '1') (S410).

If the read flag R_FLAG has the first value (e.g., '0'), the control unit 300 determines whether the virtual read pointer VRP and the mode switch pointer MTP indicate a same entry (S411). If the virtual read pointer VRP and the mode switch pointer MTP indicate different entries, the control unit 300 reads the data DT from an entry indicated by the virtual read pointer VRP in the main FIFO unit 100, output the read data DT through the read channel and keeps the read flag R_FLAG as the first value (e.g., '0') (S412). If the virtual read pointer VRP and the mode switch pointer MTP indicate a same entry, the control unit 300 reads the data DT from an entry indicated by the auxiliary read pointer ARP in the auxiliary FIFO unit 200, outputs the read data DT through the read channel, releases the mode switch pointer MTP and switches the read flag R_FLAG to the second value (e.g., '1') (S413).

If the read flag R_FLAG has the second value (e.g., '1'), the control unit 300 reads the data DT from an entry indicated by the auxiliary read pointer ARP in the auxiliary FIFO unit 200 and outputs the read data DT through the read channel (S414). After that, the control unit 300 determines whether the auxiliary read pointer ARP indicates the last entry of the dual-port memory 210 (e.g., whether the control unit 300 reads the data DT from the last entry of the dual-port memory 210 in the step S414) (S415). If the auxiliary read pointer ARP does not indicate the last entry of the dual-port memory 210 (e.g., the control unit 300 did not read the data DT from the last entry of the deal-port memory 210 in the step S414), the control unit 300 keeps the read flag R_FLAG as the second value (e.g., '1') (S416). If the auxiliary read pointer ARP indicates the last entry of the dual-port memory 210 (e.g., the control unit 300 reads the data DT from the last entry of the dual-port memory 210 in the step S414), the control unit 300 switches the read flag R_FLAG to the first value (e.g., '0') (S417).

After that, the control unit 300 increments the virtual read pointer VRP and the auxiliary read pointer ARP (S420), and determines the operating mode based on the virtual write pointer VWP and the virtual read pointer VRP (S430). The step of determining the operating mode (S430) will be described below with reference to FIG. 17.

The control unit 300 determines whether the operating mode is switched from the normal mode to the first conflict mode (S440). If the operating mode is switched from the normal mode to the first conflict mode, the control unit 300 sets up the mode switch pointer MTP to indicate an entry indicated by the virtual write pointer VWP (S450).

FIG. 17 is a flow chart for describing a step of determining an operating mode (S260 and S430) of FIGS. 15, 16A and 16B according to an exemplary embodiment of the inventive concept.

Referring to FIG. 17, the control unit 300 determines whether an entry indicated by the virtual write pointer VWP and an entry indicated by the virtual read pointer VRP are included in a same one-port memory (S510).

If an entry indicated by the virtual write pointer VWP and an entry indicated by the virtual read pointer VRP are included in different one-port memories, the control unit 300 determines the operating mode as the normal mode (S520).

If an entry indicated by the virtual write pointer VWP and an entry indicated by the virtual read pointer VRP are included in a same one-port memory, and the virtual read pointer VRP precedes the virtual write pointer VWP or the virtual read pointer VRP catches up to the virtual write pointer VWP such that the virtual write pointer VWP and the virtual read pointer VRP indicate a same entry, the control unit 300 determines the operating mode as the first conflict mode (S530).

If an entry indicated by the virtual write pointer VWP and an entry indicated by the virtual read pointer VRP are included in a same one-port memory, and the virtual write pointer VWP precedes the virtual read pointer VRP or the virtual write pointer VWP catches up to the virtual read pointer VRP such that the virtual write pointer VWP and the virtual read pointer VRP indicate a same entry, the control unit 300 determines the operating mode as the second conflict mode (S540).

The method of writing and reading data in a FIFO memory device described above with reference to FIGS. 14 to 17 may be performed by the FIFO memory device 10 of FIG. 1. A structure and an operation of the FIFO memory device 10 of FIG. 1 are described above with reference to FIGS. 1 to 13. Therefore, a detailed description of steps in FIGS. 14 to 17 is not provided.

Figure 18:
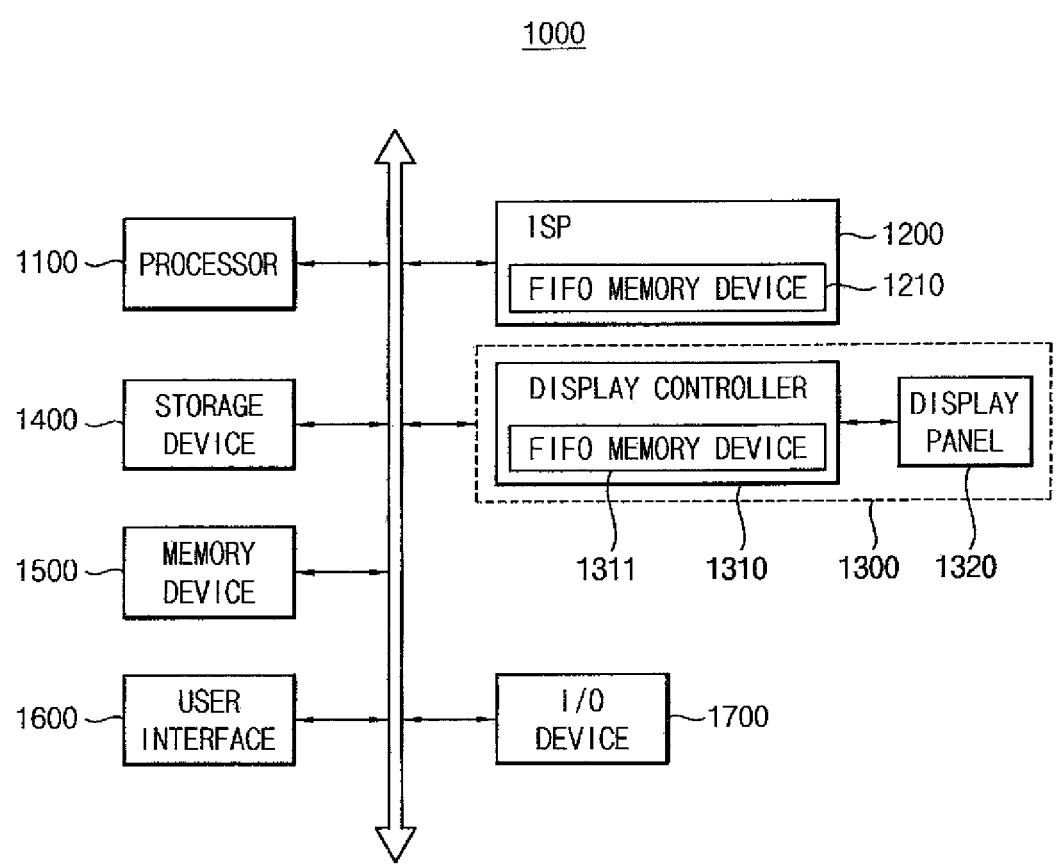
FIG. 18 is a block diagram illustrating an electronic apparatus according to an exemplary embodiment of the inventive concept.

FIG. 18 is a block diagram illustrating an electronic apparatus according to an exemplary embodiment of the inventive concept.

Referring to FIG. 18, the electronic apparatus 1000 includes a processor 1100 and a plurality of peripheral devices 1200 and 1300.

Each of the plurality of peripheral devices 1200 and 1300 includes a FIFO memory device 1210 and 1311, and transmit and receive data using the FIFO memory device 1210 and 1311.

In FIG. 18, the plurality of peripheral devices include an image signal processor ISP 1200 and a display device 1300 as an example. However, embodiments of the inventive concept are not limited thereto.

The electronic apparatus 1000 may further include a storage device 1400 and a memory device 1500.

The processor 1100 controls operations of the plurality of peripheral devices 1200 and 1300, the storage device 1400 and the memory device 1500. The processor 1100 may perform various computing functions, such as executing specific software for performing specific calculations or tasks. For example, the processor 1100 may be a microprocessor or a central processing unit. The processor 1100 may be connected to the plurality of peripheral devices 1200 and 1300, the storage device 1400 and the memory device 1500 via a bus such as an address bus, a control bus, a data bus, etc. The processor 1100 may be connected to an extended bus, such as peripheral component interconnect (PCI) bus.

The processor 1100 may have a single core architecture or a multi core architecture. For example, the processor 1100 may have a single core architecture when an operating frequency of the processor 1100 is less than 1 GHz, and a multi core architecture when an operating frequency of the processor 1100 is greater than 1 GHz. In an exemplary embodiment of the inventive concept, the processor 1100 having the multi core architecture communicates with the plurality of peripheral devices 1200 and 1300, the storage device 1400 and the memory device 1500 via an advanced extensible interface (AXI) bus.

The storage device 1400 may store multimedia data. The storage device 1400 may include a non-volatile memory device such as a flash memory device, a solid state drive (SSD), a hard disk drive (HDD), a compact disk read-only memory (CD-ROM) drive, etc.

The memory device 1500 may store data for operations of the electronic apparatus 1000. For example, the memory device 1500 may include a frame buffer that stores frame data to be displayed on the display device 1300. The memory device 1500 may include at least one volatile memory device such as a dynamic random access memory (DRAM) device, a static random access memory (SRAM) device, etc. and/or at least one non-volatile memory device such as an erasable programmable read-only memory (EPROM) device, an electrically erasable programmable read-only memory (EEPROM) device, a flash memory device, etc.

The image signal processor 1200 may read the multimedia data from the storage device 1400, generate the frame data by transforming the multimedia data and store the frame data in the frame buffer included in the memory device 1500 using the FIFO memory device 1210.

The display device 1300 may include a display controller 1310 and a display panel 1320. The display controller 1310 may read the frame data from the frame buffer included in the memory device 1500 and provide the frame data to the display panel 1320 using the FIFO memory device 1311. The display panel 1320 may display the frame data. The display device 1300 may include any type of device such as an organic light emitting display (OLED) device, a liquid crystal display (LCD) device, etc.

The FIFO memory devices 1210 and 1311 included in each of the plurality of peripheral devices 1200 and 1300 may be implemented with the FIFO memory device 10 of FIG. 1. Therefore, the electronic apparatus 1000 may increase operation speed and reduce power consumption by using the FIFO memory devices 1210 and 1311. A structure and an operation of the FIFO memory device 10 are described above with reference to FIGS. 1 to 13. Therefore, a detailed description of the FIFO memory device 1210 and 1311 is not provided here.

The electronic apparatus 1000 may further include a user interface 1600 and an input/output device 1700. Although not illustrated in FIG. 18, the electronic apparatus 1000 may further include ports to communicate with a video card, a sound card, a memory card, a universal serial bus (USB) device, etc.

The user interface 1600 may include devices required for a user to control the electronic apparatus 1000. The input/output device 1700 may include at least one input device (e.g., a keyboard, keypad, a mouse, a touch screen, etc.) and/or at least one output device (e.g., a printer, a speaker, etc.).

The processor 1100, the image signal processor 1200, the display controller 1310 and the memory device 1500 may be implemented as a system-on-chip.

The electronic apparatus 1000 may comprise any of several types of electronic devices, such as a mobile device, a smart phone, a cellular phone, a personal digital assistant (PDA), a desktop computer, a tablet computer, a laptop computer, a work station, a handheld device, a personal media player (PMP), a digital camera, etc.

The foregoing is illustrative of the present inventive concept and is not to be construed as limiting thereof. Although exemplary embodiments of the concept have been described herein, many modifications are possible in these exemplary embodiments without materially departing from the present inventive concept. Accordingly, all such modifications are intended to be included within the scope of the present inventive concept.

What is claimed is:

1. A first-in first-out (FIFO) memory device, comprising:
a main FIFO unit including first through N-th one-port memories, each of the first through the N-th one-port memories including M entries, wherein N and M are integers greater than or equal to two;
an auxiliary FIFO unit including one dual-port memory, the dual-port memory including M entries; and
a control unit configured to perform a write operation by receiving a write command and data and storing the data in one of the main FIFO unit and the auxiliary FIFO unit based on an operating mode, and configured to perform a read operation by receiving a read command and reading the data from one of the main FIFO unit and the auxiliary FIFO unit based on the operating mode,
wherein the operating mode is based on whether a pointer corresponding to the write operation references a same one of the one-port memories as a pointer corresponding to the read operation,
wherein the control unit includes a virtual write pointer and a virtual read pointer, which circularly indicate entries of the first through the N-th one-port memories from a first entry of the first one-port memory to a last entry of the N-th one-port memory, and an auxiliary write pointer and an auxiliary read pointer, which circularly indicate entries of the dual-port memory from a first entry of the dual-port memory to a last entry of the dual-port memory, increments both the virtual write pointer and the auxiliary write pointer after performing the write operation and increments both the virtual read pointer and the auxiliary read pointer after performing the read operation,
wherein the control unit determines the operating mode as a normal mode if an entry indicated by the virtual write pointer and an entry indicated by the virtual read pointer are included in different one-port memories,
wherein the control unit determines the operating mode as a first conflict mode if an entry indicated by the virtual write pointer and an entry indicated by the virtual read pointer are included in a same one-port memory, and the virtual read pointer precedes the virtual write pointer or the virtual write pointer and the virtual read pointer indicate a same entry,
wherein the control unit determines the operating mode as a second conflict mode if an entry indicated by the virtual write pointer and an entry indicated by the virtual read pointer are included in a same one-port memory, and the virtual write pointer precedes the virtual read pointer or the virtual write pointer and the virtual read pointer indicate a same entry, and
wherein the control unit further includes a mode switch pointer and a read flag, and the control unit sets up the mode switch pointer to indicate an entry indicated by the virtual write pointer when the operating mode is switched from the normal mode to the first conflict mode, sets the read flag to a first value when the control unit reads the data from the main FIFO unit in response to the read command, and sets the read flag to a second value when the control unit reads the data from the auxiliary FIFO unit in response to the read command.

2. The FIFO memory device of claim 1, wherein the control unit determines the operating mode based on a number of the write operations that the control unit performed and a number of the read operations that the control unit performed.

3. The FIFO memory device of claim 1, wherein the control unit stores the data in an entry indicated by the virtual write pointer in response to the write command in the normal mode.

4. The FIFO memory device of claim 1, wherein the control unit stores the data in an entry indicated by the auxiliary write pointer in response to the write command in the first conflict mode.

5. The FIFO memory device of claim 1, wherein the control unit outputs a full signal through a write channel in response to the write command in the second conflict mode, the full signal indicating the FIFO memory device is full.

6. The FIFO memory device of claim 1, wherein when the control unit receives the read command while the read flag has the first value, the control unit reads the data from an entry indicated by the virtual read pointer if the virtual read pointer and the mode switch pointer indicate different entries, and reads the data from an entry indicated by the auxiliary read pointer, releases the mode switch pointer, and switches the read flag to the second value if the virtual read pointer and the mode switch pointer indicate a same entry.

7. The FIFO memory device of claim 6, wherein the control unit switches the operating mode from the second conflict mode to the normal mode if the virtual read pointer and the mode switch pointer indicate a same entry in the second conflict mode.

8. The FIFO memory device of claim 1, wherein when the control unit receives the read command while the read flag has the second value, the control unit reads the data from an entry indicated by the auxiliary read pointer, and if the control unit reads the data from the last entry of the dual-port memory, the control unit switches the read flag to the first value.

9. The FIFO memory device of claim 1, wherein the control unit performs at least one of a power gating and a clock gating on the first through the N-th one-port memories except for a one-port memory including an entry indicated by the virtual write pointer and a one-port memory including an entry indicated by the virtual read pointer.

10. The FIFO memory device of claim 1, wherein the control unit performs the write operation and the read operation aperiodically in response to the write command the read command received aperiodically.

11. The FIFO memory device of claim 1, wherein the control unit performs the write operation and the read operation asynchronously.

12. The FIFO memory device of claim 1, wherein the control unit performs the write operation and the read operation simultaneously when the control unit receives the write command and the read command at the same time.

13. An electronic apparatus, comprising:
a plurality of peripheral devices each of which including a first-in first-out (FIFO) memory device, each of the plurality of peripheral devices configured to transmit and receive data using the FIFO memory device; and
a processor configured to control the plurality of peripheral devices,
wherein the FIFO memory device comprises:
a main FIFO unit including first through N-th one-port memories, each of the first through the N-th one-port memories including M entries, wherein N and M are integers greater than or equal to two;
an auxiliary FIFO unit including one dual-port memory, the dual-port memory including M entries; and
a control unit configured to perform a write operation by receiving a write command and data and storing the data in one of the main FIFO unit and the auxiliary FIFO unit based on an operating mode, and configured to perform a read operation by receiving a read command and reading the data from one of the main FIFO unit and the auxiliary FIFO unit based on the operating mode,
wherein the operating mode is based on whether a pointer corresponding to the write operation references a same one of the one-port memories as a pointer corresponding to the read operation,
wherein the control unit includes a virtual write pointer and a virtual read pointer, which circularly indicate entries of the first through the N-th one-port memories from a first entry of the first one-port memory to a last entry of the N-th one-port memory, and an auxiliary write pointer and an auxiliary read pointer, which circularly indicate entries of the dual-port memory from a first entry of the dual-port memory to a last entry of the dual-port memory, increments both the virtual write pointer and the auxiliary write pointer after performing the write operation and increments both the virtual read pointer and the auxiliary read pointer after performing the read operation,
wherein the control unit determines the operating mode as a normal mode if an entry indicated by the virtual write pointer and an entry indicated by the virtual read pointer are included in different one-port memories,
wherein the control unit determines the operating mode as a first conflict mode if an entry indicated by the virtual write pointer and an entry indicated by the virtual read pointer are included in a same one-port memory, and the virtual read pointer precedes the virtual write pointer or the virtual write pointer and the virtual read pointer indicate a same entry,
wherein the control unit determines the operating mode as a second conflict mode if an entry indicated by the virtual write pointer and an entry indicated by the virtual read pointer are included in a same one-port memory, and the virtual write pointer precedes the virtual read pointer or the virtual write pointer and the virtual read pointer indicate a same entry, and
wherein the control unit further includes a mode switch pointer and a read flag, and the control unit sets up the mode switch pointer to indicate an entry indicated by the virtual write pointer when the operating mode is switched from the normal mode to the first conflict mode, sets the read flag to a first value when the control unit reads the data from the main FIFO unit in response to the read command, and sets the read flag to a second value when the control unit reads the data from the auxiliary FIFO unit in response to the read command.

14. The electronic apparatus of claim 13, wherein when the operating mode is the normal mode the control unit reads from or writes to the main FIFO unit, wherein when the operating mode is the first conflict mode the control unit reads from or writes to the auxiliary FIFO unit, and when the operating mode is the second conflict mode the control unit outputs a signal indicating the FIFO memory device is full.

15. The electronic apparatus of claim 13, wherein the normal mode occurs when a read pointer and a write pointer point to a different one of the one-port memories, wherein the first conflict mode occurs when the read pointer and the write pointer point to a same one of the one-port memories and the read pointer precedes the write pointer, and wherein the second conflict mode occurs when the read pointer and the write pointer point to a same one of the one-port memories and the write pointer precedes the read pointer.

16. A first-in first-out (FIFO) memory device, comprising:
a plurality of first through N-th one-port memories, each one-port memory comprising at least two entries;
a dual port memory comprising at least two entries; and
a control unit storing virtual read and write pointers for referencing the entries of the one-port memories,
wherein the control unit is configured to perform i) a read from or write to one of the one-port memories when the virtual read and write pointers point to different one-port memories, ii) a read from or write to the dual port memory when the virtual read and write pointers both point to a same one of the one-port memories and the read pointer precedes the write pointer, and iii) output of signal indicating the FIFO memory device is full when the virtual read and write pointer both point to a same one of the one-port memories and the write pointer precedes the read pointer,
wherein the control unit includes a virtual write pointer and a virtual read pointer, which circularly indicate entries of the first through the N-th one-port memories from a first entry of the first one-port memory to a last entry of the N-th one-port memory, and an auxiliary write pointer and an auxiliary read pointer, which circularly indicate entries of the dual port memory from a first entry of the dual port memory to a last entry of the dual port memory, increments both the virtual write pointer and the auxiliary write pointer after performing the write operation and increments both the virtual read pointer and the auxiliary read pointer after performing the read operation, wherein the control unit determines an operating mode as a normal mode if an entry indicated by the virtual write pointer and an entry indicated by the virtual read pointer are included in different one-port memories, wherein the control unit determines the operating mode as a first conflict mode if an entry indicated by the virtual write pointer and an entry indicated by the virtual read pointer are included in a same one-port memory, and the virtual read pointer precedes the virtual write pointer or the virtual write pointer and the virtual read pointer indicate a same entry, wherein the control unit determines the operating mode as a second conflict mode if an entry indicated by the virtual write pointer and an entry indicated by the virtual read pointer are included in a same one-port memory, and the virtual write pointer precedes the virtual read pointer or the virtual write pointer and the virtual read pointer indicate a same entry, and wherein the control unit further includes a mode switch pointer and a read flag, and the control unit sets up the mode switch pointer to indicate an entry indicated by the virtual write pointer when the operating mode is switched from the normal mode to the first conflict mode, sets the read flag to a first value when the control unit reads the data from the main FIFO unit in response to the read command, and sets the read flag to a second value when the control unit reads the data from the auxiliary FIFO unit in response to the read command.

17. The FIFO memory device of claim 16, wherein the auxiliary read and write pointer are for referencing the entries of the dual port memory, wherein the virtual and auxiliary read pointers are incremented together by the control unit, and the virtual and auxiliary write pointers are incremented together by the control unit.

* * * * *